US012033493B2

(12) United States Patent
Chopra et al.

(10) Patent No.: US 12,033,493 B2
(45) Date of Patent: *Jul. 9, 2024

(54) SYSTEMS AND METHODS FOR PROCESSING EMERGENCY ALERT NOTIFICATIONS

(71) Applicant: Walmart Apollo, LLC, Bentonville, AR (US)

(72) Inventors: Tanvi Chopra, San Francisco, CA (US); Grace K. Shea, Mill Valley, CA (US); Sharon Grayce Randolph, San Francisco, CA (US); David M. Nelms, Rogers, AR (US); Rajesh Singh, Frisco, TX (US); Kartik S. Soni, Allen, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,247

(22) Filed: May 9, 2023

(65) Prior Publication Data

US 2023/0282095 A1 Sep. 7, 2023

Related U.S. Application Data

(63) Continuation of application No. 17/963,525, filed on Oct. 11, 2022, now Pat. No. 11,682,292, which is a (Continued)

(51) Int. Cl.
*G08B 25/01* (2006.01)
*G08B 27/00* (2006.01)

(52) U.S. Cl.
CPC ......... *G08B 25/016* (2013.01); *G08B 27/005* (2013.01)

(58) Field of Classification Search
CPC .................................................... G08B 25/016
See application file for complete search history.

(56) References Cited

U.S. PATENT DOCUMENTS

D563,992 S 3/2008 Lettau
D569,874 S 5/2008 Wasko
(Continued)

FOREIGN PATENT DOCUMENTS

CN 303728522 6/2016

OTHER PUBLICATIONS

Alertus; "Threatwatcher™ Mobile Pandemic Alerts"; <https://www.alertus.com/threatwatcher-pandemic>; available at least as early as Dec. 15, 2020; pp. 1□7.
(Continued)

*Primary Examiner* — Travis R Hunnings
(74) *Attorney, Agent, or Firm* — Foley IP Law, PLLC

(57) ABSTRACT

In some embodiments, methods and systems are provided for managing emergency notifications and incident reports at a commercial facility. A graphical interface enables a worker associated with a facility to input information regarding an ongoing/impending emergency event, e.g., Active Threat, Acts of Violence, Fire/Explosion, Injury, Power Failure, Missing Child, Severe Weather, Robbery, Hazmat, Bomb Threat, Covid-19, Store Closure, Special Events etc. This information is processed via an analytical engine that evaluates the entered information in view of various business rules in order to identify the appropriate workers to notify, and generates and transmits the notifications to the employees determined to be suitable for receiving a notification. In response to the generation of the emergency notification, an incident report engine evaluates the entered emergency, and
(Continued)

automatically generates an incident report, which may be later accessed and/or modified by workers having a suitable employee access level.

20 Claims, 22 Drawing Sheets

Related U.S. Application Data continuation of application No. 17/190,195, filed on Mar. 2, 2021, now Pat. No. 11,501,630.

(56) References Cited

U.S. PATENT DOCUMENTS

| | | | | |
|---|---|---|---|---|
| D650,804 | S | 12/2011 | Impas | |
| D659,158 | S | 5/2012 | Clymer | |
| D667,459 | S | 9/2012 | Phelan | |
| 8,955,103 | B2 | 2/2015 | Kline, III | |
| D804,524 | S | 12/2017 | Zin | |
| D831,048 | S | 10/2018 | Sagrillo | |
| D836,658 | S | 12/2018 | Andrew | |
| 10,470,013 | B1 | 11/2019 | Mendelson | |
| D869,500 | S | 12/2019 | Mason | |
| D872,112 | S | 1/2020 | Shaikh | |
| D898,767 | S | 10/2020 | Shah | |
| D914,750 | S | 3/2021 | Bettig | |
| 11,501,630 | B2 * | 11/2022 | Chopra | G08B 27/005 |
| D986,256 | S | 5/2023 | Kim | |
| 11,682,292 | B2 * | 6/2023 | Chopra | G08B 27/005 455/404.2 |
| 2007/0298758 | A1 | 12/2007 | Verma | |
| 2009/0138353 | A1 | 5/2009 | Mendelson | |
| 2016/0050037 | A1 | 2/2016 | Webb | |
| 2019/0387386 | A1 * | 12/2019 | Sethi | H04B 7/0426 |
| 2020/0371667 | A1 | 11/2020 | Chen | |

OTHER PUBLICATIONS

Amoghdesign. "Weather vol. 01 icon pack." Iconfinder, published Sep. 19, 2017 (Retrieved from the Internet Sep. 16, 2022). Internet URL: <https://www.iconfinder.com/iconsets/weather-vol-01-3> (Year: 2017).
Coquet, Adrien. "Fight." Noun Project, published May 25, 2018 (Retrieved from the Internet Sep. 16, 2022). Internet URL: <https://thenounproject.com/icon/fight-1772868/> (Year: 2018).
Creative Stall. "Warning Solid 2 icon pack." Iconfinder, published Jun. 2, 2015 (Retrieved from the Internet Sep. 16, 2022). Internet URL: <https://www.iconfinder.com/iconsets/warning-solid-icons-2> (Year: 2015).
Davis, Ben. "radioactivity." Noun Project, published Jun. 1, 2016 (Retrieved from the Internet Sep. 16, 2022). Internet URL: <https://thenounproject.com/icon/radioactivity-490591/> (Year: 2016).
DESKALERTS; "Active Directory Integration"; <https://www.alert-software.com/active-directory-integration>; Sep. 28, 2020; retrieved from Internet Archive Wayback Machine <https://web.archive.org/web/20200928153914/https://www.alert-software.com/active-directory-integration> on May 27, 2021; pp. 1-8.
DESKALERTS; "Active Directory Integration"; https://www.alert-software.com/active-directory-integration; Dec. 17, 2020, pp. 1-8.
DESKALERTS; "Real-Time Mass Notification Module"; <https://www.alert-software.com/real-time-mass-notifications>; Nov. 9, 2018; retrieved from Internet Archive Wayback Machine <https://web.archive.org/web/20181109202717/https://www.alert-software.com/real-time-mass-notifications> on May 27, 2021; pp. 1-8.
DESKALERTS; "Real-Time Mass Notification Solution"; https://www.alert-software.com/real-time-mass-notifications; Dec. 18, 2020, pp. 1-9.
Duncan, Caroline; "How the DeskAlerts Emergency App Helps You Keep Your Employees Safe"; <https://www.alert-software.com/blog/how-the-deskalerts-emergency-app-helps-you-keep-your-employees-safe>; Aug. 4, 2020; pp. 1-12.
Gilmore, Lauren. "7 essential personal safety apps for emergency situations." The Next Web, published Nov. 17, 2015 (Retrieved from the Internet Sep. 16, 2022). Internet URL: <https://thenextweb.com/news/7-essential-personal-safety-apps-for-emergency-situations> (Year: 2015).
Iqbal, Mohammad. "Fire Smoke." Noun Project, published Apr. 24, 2019 (Retrieved from the Internet Sep. 16, 2022). Internet URL :<https://thenounproject.com/icon/fire-smoke-2580578/> (Year: 2019).
Nesterenko, Ruslan. "Police. Filled. Color icon pack." Iconfinder, published Nov. 11, 2018 (Retrieved from the Internet Sep. 16, 2022). Internet URL: <https://www.iconfinder.com/iconsets/police-filled-color> (Year: 2018).
Singlewire Software; "Informacast For Retail"; <https://www.singlewire.com/informacast-retail>; Jun. 11, 2017; retrieved from Internet Archive Wayback Machine <https://web.archive.org/web/20170611220953/https://www.singlewire.com/informacast-retail> on May 27, 2021; pp. 1-4.
Singlewire Software; "Lockdown"; <https://www.singlewire.com/informacast/use-case/building-lockdown>; May 12, 2020; retrieved from Internet Archive Wayback Machine <https://web.archive.org/web/20200512052945/https://www.singlewire.com/informacast/use-case/building-lockdown> on May 27, 2021; pp. 1-5.
Singlewire; "Building Lockdown"; https://www.singlewire.com/informacast/use-case/building- lockdown; Dec. 18, 2020, pp. 1-2.
Singlewire; "Mass Notification System"; https://www.singlewire.com/informacast-retail; Dec. 18, 2020, pp. 1-3.
U.S. Appl. No. 17/190,195; Notice of Allowance mailed Jul. 27, 2022; (7 pages).
U.S. Appl. No. 17/963,525; Notice of Allowance and Fees Due (PTOL-85) mailed Feb. 10, 2023; (pp. 1-5).
U.S. Appl. No. 29/772,552; Ex Parte Quayle Action mailed Sep. 27, 2022; (7 pages).
U.S. Appl. No. 29/772,552; Notice of Allowance mailed Jan. 5, 2023; (6 pages).
U.S. Appl. No. 29/772,552; Requirement for Restriction mailed May 6, 2022; (5 pages).

* cited by examiner

FIG. 9
152
150
154
9:41
Monday, June 3
Tornado warning for Topeka, KS until 9:00 pm. Store 1234 is now closed.

SYSTEMS AND METHODS FOR PROCESSING EMERGENCY ALERT NOTIFICATIONS

CROSS-REFERENCE TO RELATED APPLICATIONS

This application is a continuation of U.S. application Ser. No. 17/963,525, filed Oct. 11, 2022, which is a continuation of U.S. application Ser. No. 17,190,195, filed Mar. 2, 2021, now, U.S. Pat. No. 11,501,630, the content of which is hereby incorporated by reference in its entirety.

TECHNICAL FIELD

This invention relates generally to emergency notifications and, in particular, to generating and processing emergency notifications and incidents reports at commercial facilities.

BACKGROUND

In the event of an emergency situation affecting a retail store, the typical response protocol calls for the retail store manager and/or another senior employee is to make a phone call to an Emergency Operation Center (EOC) covering the geographic area where the retail store is located to report the emergency and to provide all relevant details relating to the emergency, after which an EOC employee manually creates an incident report (e.g., by typing in all information relevant to the emergency incident into a fillable form).

Notably an EOC of a large retailer could receive 250-600 calls per day and every phone call could last from 3-5 minutes or longer (assuming no on hold time). Generally, the manual nature of emergency reporting from retail facility to the EOC (which is done by retail store managers, who are very busy) has been associated with low emergency reporting rates. In addition, the crisis managers at the EOC typically have to fill out the incident report manually after the phone call with the retail store manager, which often leads to unintended human errors.

BRIEF DESCRIPTION OF THE DRAWINGS

Disclosed herein are embodiments of systems and methods pertaining to generating employee notifications and incident reports in association with emergency events at a retail facility. This description includes drawings, wherein.

Figure 1:
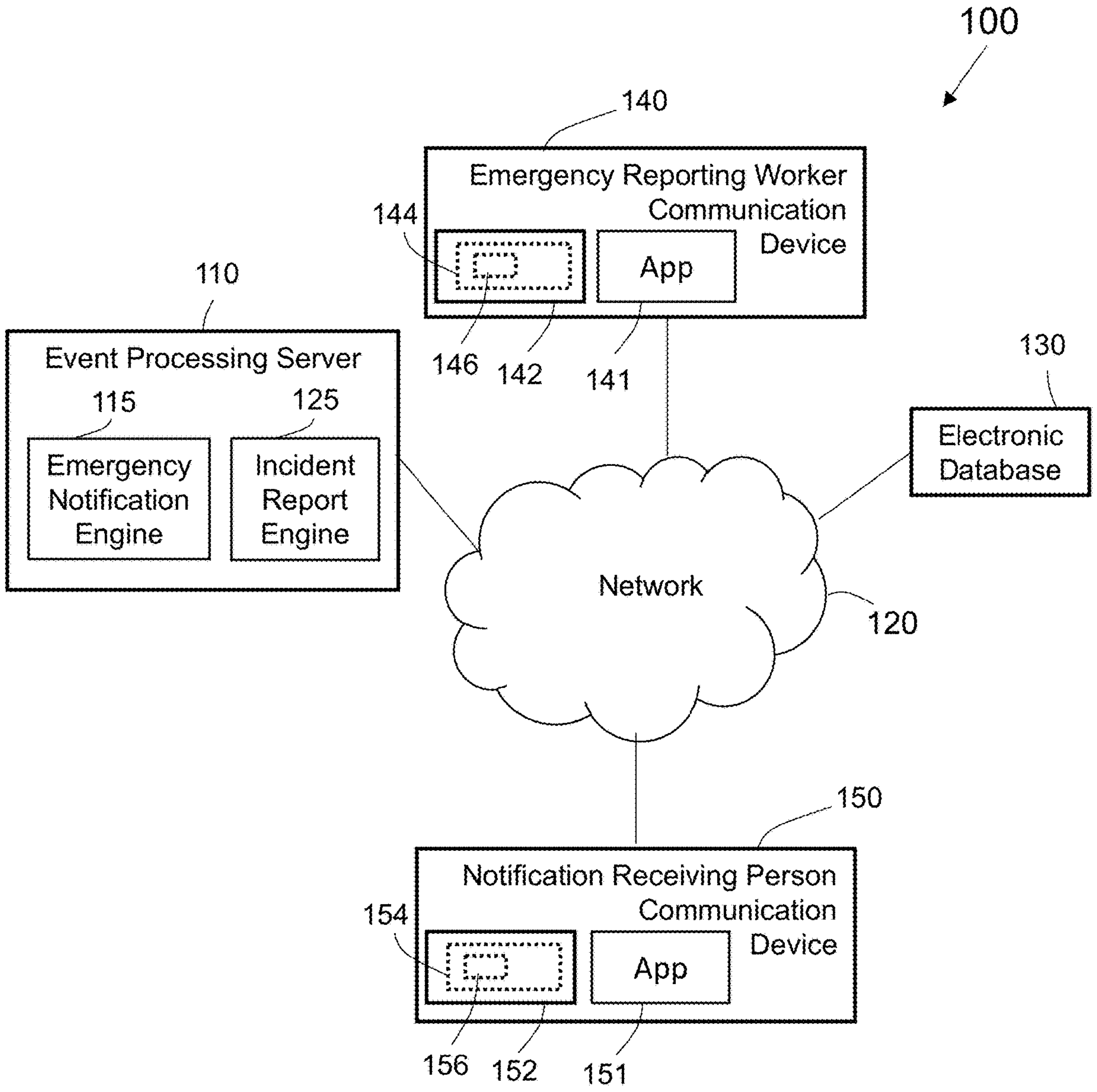
FIG. 1 is a diagram of a system of generating employee notifications and incident reports in association with emergency events at a retail facility in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for processing emergency notifications and incident reports at a commercial facility. The system may be implemented via a graphical interface (e.g., via a mobile app installed on, or an application configured to run on, a computing/communication device) that enable one or more workers of a commercial facility having a suitable employee access level (e.g., managers) to input information regarding an ongoing/impending emergency event, e.g., Active Threat, Acts of Violence, Fire/Explosion, Injury, Power Failure, Missing Child, Severe Weather, Robbery, Hazmat, Bomb Threat, Covid-19, Store Closure, Special Events etc. This information is processed via an analytical engine that evaluates the entered emergency information in view of various business rules to identify the appropriate (on-site and/or off-site) workers to notify of the emergency, and then generates and transmits the notifications to the employees determined to be suitable for receiving a notification of this emergency. In response to the generation of the emergency notification, an incident report engine evaluates the entered emergency, and automatically generates an incident report, which may be later accessed and/or further modified by one or more workers having a suitable employee access level. The systems and methods described herein may include a function to notify the customers located at the commercial facility (e.g., a retail store or a company of any size) of an ongoing emergency.

In some embodiments, a system for generating employee notifications and incident reports in association with emergency events at a retail facility includes a server including a processor-based control circuit and configured for communication over a network with at least one electronic device used by at least one worker at the retail facility and an application configured to be executed on the at least one electronic device, wherein the at least one electronic device is communicatively coupled via the network to the server. The application, when executed on the at least one electronic device, is configured to generate a first graphical interface on a display screen of the at least one electronic device, the first graphical interface including a plurality of interactive icons configured to permit the at least one worker to select an interactive icon representative of an ongoing emergency event at the retail facility. An interaction by the at least one worker with the interactive icon representative of an ongoing emergency event at the retail facility causes the at least one electronic device to transmit an alert signal to the server over the network, the alert signal including electronic data indicative of the ongoing emergency event at the retail facility corresponding to the interactive icon selected by the at least one worker. The server, in response to receipt of the alert signal from the at least one electronic device, is configured to: identify workers associated with the retail facility to whom a notification of the emergency event at the retail facility is to be sent by the server and transmit at least one notification signal over the network to an electronic device of each of the workers identified by the server, the at least one notification including electronic data indicative of the ongoing emergency event at the retail facility; and generate electronic data representative of a modifiable incident report in association with the ongoing emergency event at the retail facility and transmit the modifiable incident report over the network to at least one of an incident event database, a computing device of an emergency operations center associated with the retail store, and city emergency personnel associated with a geographic area where the retail store is located.

In some embodiments, a method for generating employee notifications and incident reports in association with emergency events at a retail facility includes: providing a server including a processor-based control circuit and configured for communication over a network with at least one electronic device used by at least one worker at the retail facility; providing an application configured to be executed on the at least one electronic device, wherein the at least one electronic device is communicatively coupled via the network to the server; and generating a first graphical interface on a display screen of the at least one electronic device, the first graphical interface including a plurality of interactive icons configured to permit the at least one worker to select an interactive icon representative of an ongoing emergency event at the retail facility. The method further includes, in response to an interaction by the at least one worker with the interactive icon representative of an ongoing emergency event at the retail facility, transmitting, from the at least one electronic device, an alert signal to the server over the network, the alert signal including electronic data indicative of the ongoing emergency event at the retail facility corresponding to the interactive icon selected by the at least one worker. The method further includes, in response to receipt of the alert signal from the at least one electronic device and by the server: identifying workers associated with the retail facility to whom a notification of the emergency event at the retail facility is to be sent by the server; transmitting at least one notification signal over the network to an electronic device of each of the workers identified by the server, the at least one notification including electronic data indicative of the ongoing emergency event at the retail facility; generating electronic data representative of a modifiable incident report in association with the ongoing emergency event at the retail facility; and transmitting the modifiable incident report over the network to at least one of an incident event database, a computing device of an emergency operations center associated with the retail store, and city emergency personnel associated with a geographic area where the retail store is located.

FIG. 1 shows an embodiment of a system 100 for system for generating notifications and incident reports in connection with emergency events at a retail facility. A retail facility will be understood to mean any facility where any kind of business is conducted. Exemplary retail facilities may include but are not limited to retail stores, grocery stores, furniture store, general department stores, schools, universities, hospitals, manufacturing plants, software companies, financial companies, pharmaceutical companies, and the like. An emergency even will be understood to mean any event that is adverse to, or inconsistent with, normal operation of the retail facility and/or the well-being of persons (employees, vendors, customers, etc.) at the retail facility, including but not limited to Active Threat, Acts of Violence, Fire, Explosion, Hazardous Materials Exposure, Bomb Threat, Injury, Power Failure, Missing Child, Severe Weather, Robbery, Covid-19, Store Closure, Special Event, etc.

The system 100 depicted in FIG. 1 includes an event processing server 110, which may be implemented as one computer/server at one facility of the retailer (e.g., retail store, regional center, data warehouse, etc.), or as multiple communicatively connected computers/servers stored at multiple facilities. In some aspects, the event processing server 110 (generically, a server) is a stationary or portable electronic device, e.g., a server, a desktop or laptop computer, a tablet, a mobile phone, or any other electronic device including a processor-based control circuit (i.e., control unit). In the embodiment of FIG. 1, the event processing server 110 is configured for data entry and processing as well as for communication with other devices of system 100 via a network 120. In the embodiment illustrated in FIG. 1, the event processing server 110 includes an emergency notification engine 115 and an incident report engine 125, which will be described in more detail below. While the emergency notification engine 115 and the incident report engine 125 have been illustrated in FIG. 1 as being incorporated into the physical structure of the event processing server 110, it will be appreciated that one or both of the emergency notification engine 115 and the incident report engine 125 may be implemented on devices that are separate and distinct from the event processing server 110.

The network 120 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, as will be described below, the event processing server 110 is configured to access an electronic database 130 and/or communicate with a communication device 140 of an emergency event-reporting worker (e.g., a manager) and/or a communication device 150 of a notification-receiving person (e.g., a sales floor associate, a customer, a delivery driver, etc.).

In the embodiment of FIG. 1, the server 110 is coupled to an electronic database 130. In some embodiments, the electronic database 130 may be configured to store information associated with the emergency notifications generated and/or submitted by an emergency reporting worker of a retail facility using the worker's communication device 140. Generally, the electronic database 130 stores electronic information representing the details associated with the emergency event that has been reported by the emergency event-reporting worker, electronic information representing the modifiable incident reports that are generated by or via the event processing server 110 in response to a submission of an emergency event via the communication device 140 of the emergency reporting worker, as well as electronic information that may be communicated to the event processing server 110 from a communication device 150 of one or more emergency notification-receiving workers. The electronic database 130 may be stored, for example, on non-volatile storage media (e.g., a hard drive, flash drive, or removable optical disk) internal or external to the event processing server, or internal or external to computing devices separate and distinct from the server 110. It will be appreciated that the electronic database 130 may likewise be cloud-based. While the server 110 is shown in FIG. 1 in communication over the network 120 with one electronic database (i.e., database 130), it will be appreciated that the server 110 may be coupled via the network 120 to two or more electronic databases.

As mentioned above, in the exemplary system 100 illustrated in FIG. 1, one or both of the event processing server 110 and the electronic database 130 are configured for one-way and/or two-way communication over the network 120 with communication devices 140, 150 of workers associated with the retail facility. As used herein, the term worker will be understood to refer to any person having a contractual affiliation with the retail facility. Exemplary workers of a retail store may include but are not limited to sales floor associates may include sales floor associates, stock room associates, cashiers, security guards, delivery drivers, department managers, store managers, regional managers, director-level personnel, emergency operations center personnel, human resources department personnel, corporate department personnel, legal department personnel, etc. As discussed in more detail below, each of the workers is classified within a certain user access level (e.g., associate, manager, senior manager, director, etc.), which determines the emergency event reporting functionalities and the incident report viewing/editing functionalities available to the worker when using the worker's communication device 140, 150. In some embodiments, the user access level information associated with the workers is stored in the electronic database 130 for subsequent retrieval by the event processing server 110 (e.g., in response to an attempted submission of an emergency event notification by a worker via the worker's communication device 140).

Generally, the communication device 140, 150 of a worker may be stationary, portable, and/or hand-held electronic device, for example, a desktop computer, a laptop computer, a tablet, a mobile phone, or any other electronic, processor-based device configured for data entry and communication with the event processing server 110. In some aspects, the communication devices 140 and 150 may be referred to as electronic devices used by workers at the retail facility. In some aspects, the communication device 140 is configured to enable the worker to enter electronic data pertaining to an emergency event alert. In one aspect, this functionality is provided by an application configured to be executed on the communication device 140, and which permits the communication device 140 to communicate electronic information indicative of an emergency at the retail facility via the network 120 to the event processing server 110.

In some embodiments, the first graphical interface 144 may be provided by or caused to be displayed by a retailer-associated mobile application 141 (app) installed on the communication device 140 and configured to display various user displays or display portions having menu options, notifications, and/or alerts for the worker. In certain embodiments, when executed on the communication device 140 of the emergency reporting worker, the application 141 is configured to output signaling to generate a first graphical interface 144 on a display screen 142 of the communication device 140 to permit a worker using the application to submit an emergency alert to the event processing server 110. In one aspect, the first graphical interface 144 may include one or more graphical input fields 146 in the form of menu options and/or sub-interfaces that permit the worker to generate and submit an emergency alert (including the relevant details) to the event processing server 110.

In some embodiments, the second graphical interface 154 may be provided by or caused to be displayed by a retailer-associated mobile application 151 (app) installed on the communication device 150 and configured to display various user displays or display portions having menu options, notifications, and/or alerts for the worker. In certain embodiments, when executed on the communication device 150 of the emergency notification receiving worker, the application 151 is configured to output signaling to generate a second graphical interface 154 on a display screen 152 of the communication device 150 to permit a worker using the application 151 to actively respond to the emergency notification within the second graphical interface 154 and/or to perform certain actions at the retail facility. In one aspect, the second graphical interface 154 may include one or more graphical input fields 156 in the form of menu options and/or sub-interfaces that permit the worker to respond to the emergency alert (e.g., mark the worker as safe or not safe).

For example, electronic alerts may be transmitted to the communication device 140 from the server 110 and/or from the communication (i.e., electronic) device 150 of a person who received the emergency notification that was generated by the server 110 in response to the user of the communication device 140 generating an emergency alert. In some aspects, instead of being generated within a mobile application (app) installed the communication device 140, the first graphical interface 144 can be an internet-based form having a defined uniform resource locator (URL) address and being accessible via an internet browser of the communication device 140 and/or 150, the internet browser being a form of the application 141 and/or 151.

As described above, the communication devices 140 and 150 include an application 141 and 151, respectively. Generally, these applications 141 and 151 comprise computer program code that is configured to be installed on and executed by the communication devices 140, 150 (e.g., by a processor or control circuit of the devices). The applications 141, 151 can be executed by the communication devices in concert with other software modules or applications (computer program code), or groups of applications, such as operating systems, locating applications (e.g., a mapping, GPS, etc. applications), two-factor authentication (TFA) applications, single sign on (SSO) applications, graphics processing/driver applications, security applications, etc.

In some embodiments, the application 141 and/or the application 151 are dedicated applications (e.g., an application specific to a retailer and/or specific to the functions described herein). In some embodiments, the application 141 and/or the application 151 are general applications that perform the functions as described herein but also perform other functions in the operation of the communication devices. In some embodiments, the application 141 and/or the application 151 are an add-on application installed on the communication device and that cooperates with other application/s of the communication device, such as the operating system and works with the other application/s to provide the functionality described herein. For example, the application 141 is an add-on application that performs the functions to cause the display of and receive user inputs such as shown in FIGS. 2-6, and in doing so communicates with the operating system application of the communication device 140 to control at least the display screen 142 and user inputs, and uses the communication transceivers and other input/output to communicate with other components in the system.

In some embodiments, the add on application is an add on browser application that cooperates with graphical displays generated by and transmitted to the communication device from a server for display at the communication device. And, in some embodiments, the application 141 and/or the application 151 are integral with other application/s of the communication device such as the operating system. For example, the integral application would cause the operation of the display screen and user inputs, and all other functions of the communication device. In some embodiments, where the application is integral with the operating system, the application may be considered a functional portion or module of the operating system, such as a browser or other dedicated functional module.

In some aspects, as the communication device 140 of the worker attempts to connect over the network 120 to the event processing server 110, the server 110 may request a verification of the identity (e.g., username/password) of the user of the communication device 140. The server 110 may verify the identity of the user of the communication device 140 (e.g., by comparing the username/password data entered by the user of the communication device 140 into the login interface against username/password data associated in the profile of the user stored in the electronic database 130). The server 110 may then associate the profile of the user, retrieve the information stored in the profile and enable the user to log in to the server 110.

Notably, in some aspects, the profile of each worker associated with a retail facility may include electronic data representative of the access level classification of the worker. Thus, in some aspects, workers who are confirmed by the server 110 to be at or above a certain predetermined user access level (e.g., manager) would have access to the first graphical interface 144 configured to include features (e.g., interactive graphical icons, as will be described below) that enables the user of the communication device 140 to submit an emergency alert to the server 110, while workers who are confirmed by the server 110 to be below a certain predetermined user access level (e.g., manager) would either not have any access to the first graphical interface 144, or would have access to a limited version of the first graphical interface 144, where the user does not have access to the features that permit the user to submit an emergency alert to the server 110.

As pointed out above, and will be described in more detail below, after an emergency alert is submitted to the event processing server 110 over the network 120 by a user having a suitable access level, the event processing server 110 processes this emergency alert and generates an incident report, which includes various details regarding the incident (e.g., details regarding the incident giving rise to the emergency alert, the time and place of the incident, the worker who submitted the emergency alert, etc.). This incident report may be transmitted by the server 110 to the electronic database 130 for storage, and the incident report may be accessible on the electronic database 130 later by a worker using the worker's communication device 140, 150 such that the worker may view and/or modify (e.g., update) the incident report. In some aspects, workers who are confirmed by the server 110 to be at or above a certain predetermined user access level (e.g., manager) would be permitted to access and/or modify the incident report on the electronic database 130, while workers who are confirmed by the server 110 to be below the certain predetermined user access level (e.g., manager) would not be permitted to access and/or modify the incident report on the electronic database 130.

Figure 2:
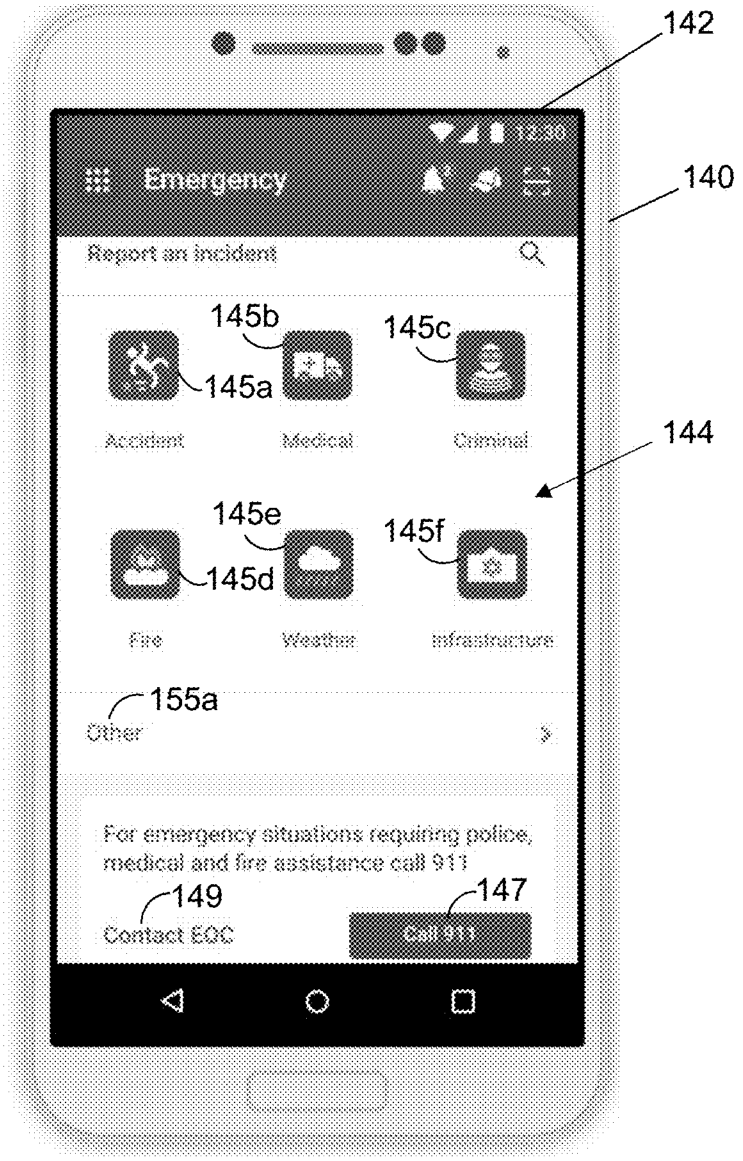
FIG. 2 depicts a communication device displaying a user interface portion associated with an exemplary first graphical interface generated by an application executable on the communication device and showing user-selectable icons associated with various emergencies in accordance with some embodiments.

A user interface portion of an exemplary first graphical interface 144 that may be generated by or caused to be displayed by an application 141 executable on the communication device 140 to permit the user of the communication device 140 to report an emergency event at a retail facility is illustrated in FIG. 2. As can be seen in FIG. 2, the first graphical interface 144 includes multiple interactive graphical icons 145*a*-145*f* that are configured to permit the user of the communication device 140 to select an interactive icon representative of an ongoing emergency event at the retail facility. In the example shown in FIG. 2, the interactive icons visible to, and selectable by, the user of the communication device 140 include the following: Accident 145*a*, Medical 145*b*, Criminal 145*c*, Fire 145*d*, Weather 145*e*, and Infrastructure 145*f*. In addition, in the example shown in FIG. 2, the interactive icons visible to, and selectable by, the user of the communication device 140 include: (1) an interactive icon 147 (Call 911) that permits the user of the communication device 140 to directly contact the city emergency personnel associated with a geographic area where the retail store is located; and (2) an interactive icon 149 (Contact EOC) that permits the user of the communication device 140 to directly contact (e.g., via a voice connection, chat connection, text message, etc.) the Emergency Operations Center associated with the geographic area where the retail store is located in order to either report the emergency event, obtain logistical assistance, or for any other suitable reason.

Notably, the first graphical interface 144 is not limited to permitting the user to select from only six possible emergency events. Instead, as shown in FIG. 2, the first graphical interface 144 may include an interactive element/icon 155*a* (called Other in this example), which, when pressed, causes more graphical icons associated with other emergency events to appear within the first graphical interface 144 on the display screen 142 of the communication device 140, allowing the user to select interactive icons associated with other emergency events including but not limited to the following: Active Threat, Acts of Violence, Fire, Explosion, Hazardous Materials Exposure, Bomb Threat, Injury, Power Failure, Missing Child, Severe Weather, Robbery, Covid-19, Store Closure, Special Event, etc. For example, after the interactive icon 155*a* in FIG. 2 is pressed by a user, the first graphical interface 144 generated on the screen 142 of the communication device 140 may include the following interactive icons visible to, and selectable by, the user of the communication device 140: Active Threat 145*g*, Robbery 145*h*, Bomb Threats 145*j*, Injury 145*k*, Missing Child 145*m*, and Fire/Explosion 145*n*. Notably, the exemplary first graphical interface 144 shown in FIG. 6 may further include an interactive icon/button 155*b* (called Show More in this example), which, when pressed, causes additional graphical icons associated with other emergency events to appear within the first graphical interface 144 on the display screen 142 of the communication device 140.

Figure 6:
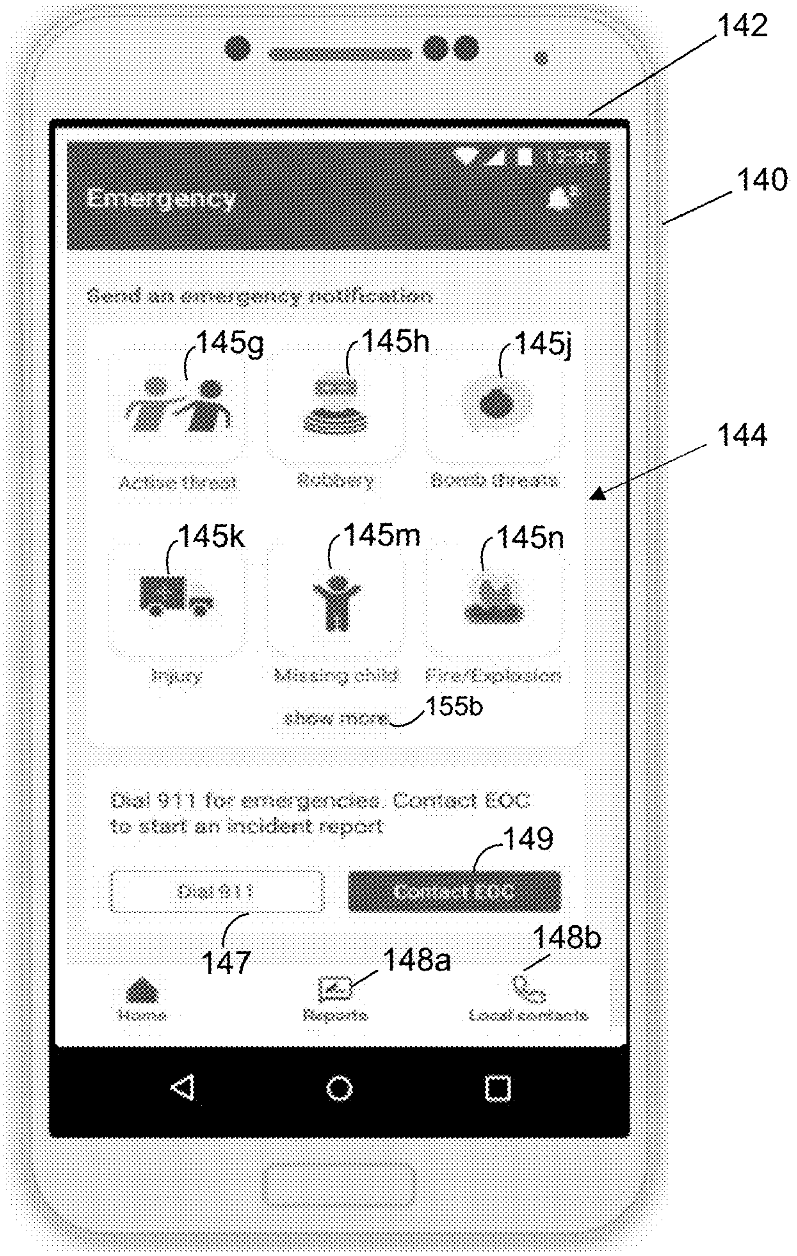
FIG. 6 depicts a communication device displaying a user interface portion associated with another exemplary first graphical interface generated by an application executable on the communication device and showing user-selectable icons associated with various emergencies in accordance with some embodiments.

Notably, the user interface portion of the exemplary first graphical interface 144 shown in FIG. 6 may include an interactive icon/button 148*a* (called Reports in this example), which, when pressed, allows the user of the communication device 140 to access and/or modify one or more emergency event incident reports (which will be discussed in more detail below) that are stored in the electronic database 130. In addition, the exemplary first graphical interface 144 shown in FIG. 6 may include an interactive icon/button 148*b* (called Local Contacts in this example), which, when pressed, allows the user of the communication device 140 to contact various internal and external departments/agencies including but not limited to Biohazard/Blood-Borne Pathogen Group, Electrical Company, Food Safety, Gas Company, Local Emergency Management, Local Health Department, Phone Company, Poison Control, Resource for Living, Sewage Company, Water Company, and the like.

As described in more detail below with reference to FIGS. 2-7, an interaction by a user of the communication device 140 (e.g., a worker having an access level having a permission to initiate emergency alerts) with an interactive icon 145*a*-145*n* representative of an ongoing emergency event at the retail facility causes the communication device 140 to transmit an alert signal to the event processing server 110 over the network 120, and this alert signal includes electronic data indicative of the ongoing emergency event at the retail facility that corresponds to the interactive icon selected by the user. In the example discussed herein, the hypothetical ongoing emergency event at a retail facility is criminal activity, and the worker would see that interactive icon 145*c* within the first graphical interface 144 corresponds to criminal activity (see FIG. 2), and would press that the icon 145*c* with his/her finger. As mentioned above and shown in FIG. 2, the worker also presented with the option to directly contact the emergency operations center (EOC) associated with the retail facility by clicking/touching the interactive icon 149 (which is called Contact EOC) city emergency personnel (e.g., police, fire, ambulance) by clicking/touching the interactive icon 147 (which is called Call 911).

Figure 3:
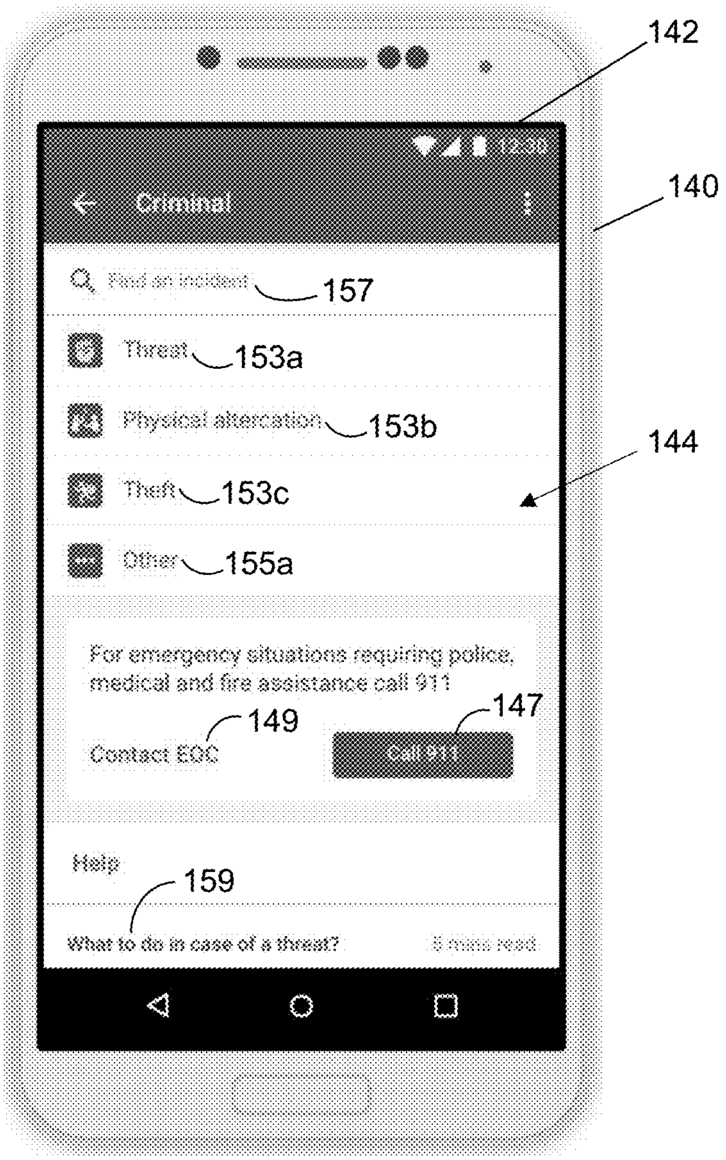
FIG. 3 depicts a communication device displaying a user interface portion associated with the first graphical interface of FIG. 2 in accordance with some embodiments.

After the worker presses the interactive icon 145*c* visible in FIG. 2, the first graphical interface 144 advances to the user interface portion or menu visible in FIG. 3. The exemplary menu of the first graphical interface 144 shown in FIG. 3 includes possible criminal incidents (e.g., threat 153*a*, physical altercation 153*b*, theft 153*c*, etc.) that the worker may select from. Notably, the first graphical interface 144 is not limited to permitting the worker to select from only three possible criminal incidents shown in FIG. 3. Instead, as shown in FIG. 3, the first graphical interface 144 may include an interactive icon/button 155*a* (called Other in this example), which, when pressed, causes more graphical icons associated with other criminal incidents to appear within the first graphical interface 144, allowing the user to select interactive icons associated with other criminal incidents. In addition, to make it easier for the worker to find the criminal incident applicable to the current situation at the retail store, the exemplary first graphical interface 144 includes a text input field 157, which permits the worker to use a text-based search for the criminal incident instead of having to look at multiple screens of graphical icons akin to the graphical icons 153*a*-153*c*. As shown in FIG. 3, the first graphical interface 144 may include an interactive icon or link 159, which, when clicked, takes the worker to a readable text that indicates the proper procedure for the worker to follow in the event of an emergency, making it easier for the worker to respond appropriately.

Figure 4:
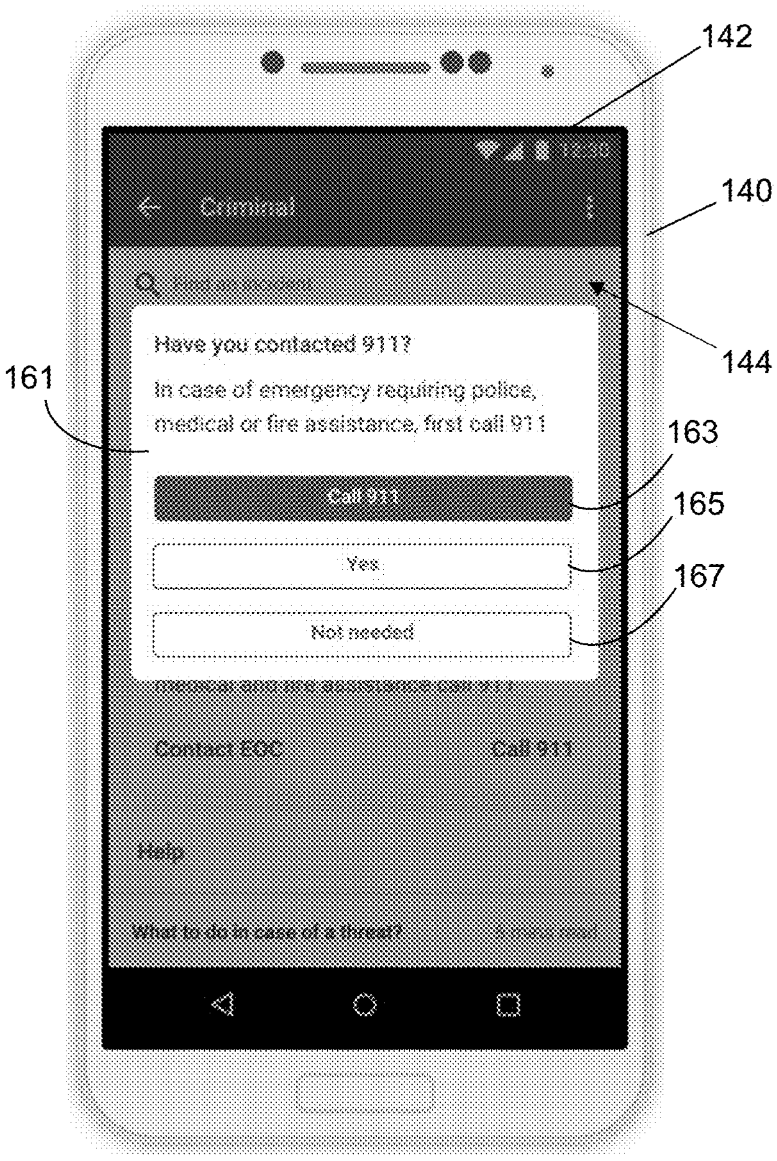
FIG. 4 depicts a communication device displaying a user interface portion associated with the first graphical interface of FIG. 3 in accordance with some embodiments.

Assuming that the hypothetical criminal incident at the retail facility is a physical altercation, after the worker presses the interactive icon 153*b* visible in FIG. 3, the first graphical interface 144 advances to the user interface portion or menu visible in FIG. 4. The exemplary menu of the first graphical interface 144 shown in FIG. 4 includes an interactive menu 161 (asking the worker if he/she called 911), which requires the worker to respond by clicking one of three possible interactive icons, namely, interactive icon 163 (Call 911), which, if pressed/touched, would initiate a call to with emergency services, interactive icon 165 (Yes), which if pressed/touched, would indicate that the worker already called 911, and interactive icon 167 (Not Needed), which, if pressed/touched, would indicate that the criminal incident at hand does not require the intervention of city emergency personnel.

Figure 5:
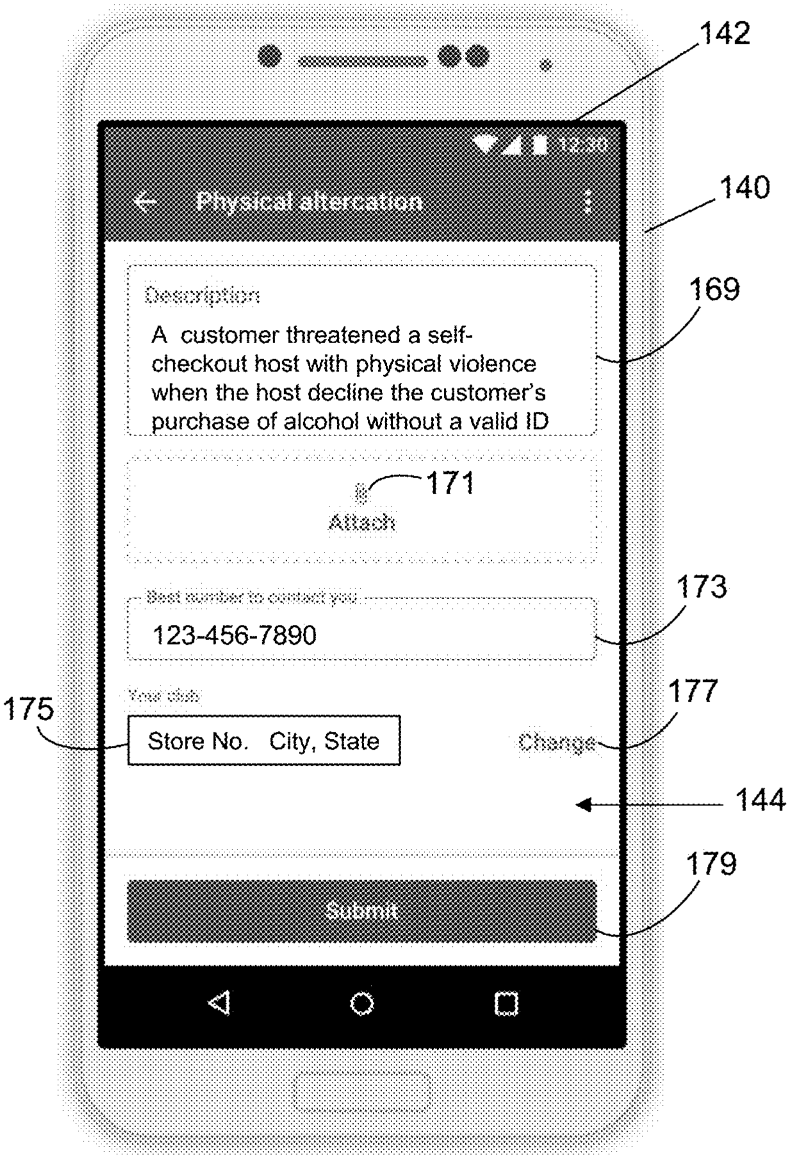
FIG. 5 depicts a communication device displaying a user interface portion associated with the first graphical interface of FIG. 4 in accordance with some embodiments.

Assuming that the hypothetical criminal incident at the retail facility is a physical altercation that does not require the intervention of city emergency personnel, after the worker presses the interactive icon 167 visible in FIG. 4, the first graphical interface 144 advances to the user display portion or menu visible in FIG. 5. The exemplary menu of the first graphical interface 144 shown in FIG. 4 includes a text input field 169, which permits the worker who is attempting to generate an emergency event alert to enter a written description relating to the physical altercation (e.g., describe the people involved, the actions that took placed, the damage and/or physical injury that was caused, etc.). The first graphical interface 144 may also include an interactive icon/link 171, which permits the worker to attach one or more files (e.g., photographs, etc.) relating to the physical altercation being reported by the worker.

Further, the first graphical interface 144 may also include a text input field 173 that permits the worker to enter his or her best contact phone number in the event that someone is interested in reaching out to the worker regarding the emergency alert. In the embodiment shown in FIG. 4, the first graphical interface 144 further includes an informational field 175 that indicates the retail facility (e.g., by a number), as well as the city and state, where the retail facility is located. Depending on where the retail facility is located, the worker may touch/press the icon/link 177 (called Change), which permits the worker select the appropriate retail facility from a list of the facilities of the retailer. Finally, the first graphical interface 144 may include an interactive icon/button 177 (called Submit), which, when selected (e.g., pressed/touched) by the worker, causes the mobile application to generate and transmit, to the event processing server 110, electronic data representing an emergency alert indicative of an ongoing emergency at the retail facility indicated in the emergency alert. The event processing server is configured to process the emergency alert received from the communication device 140 as described in more detail below.

Figure 7:
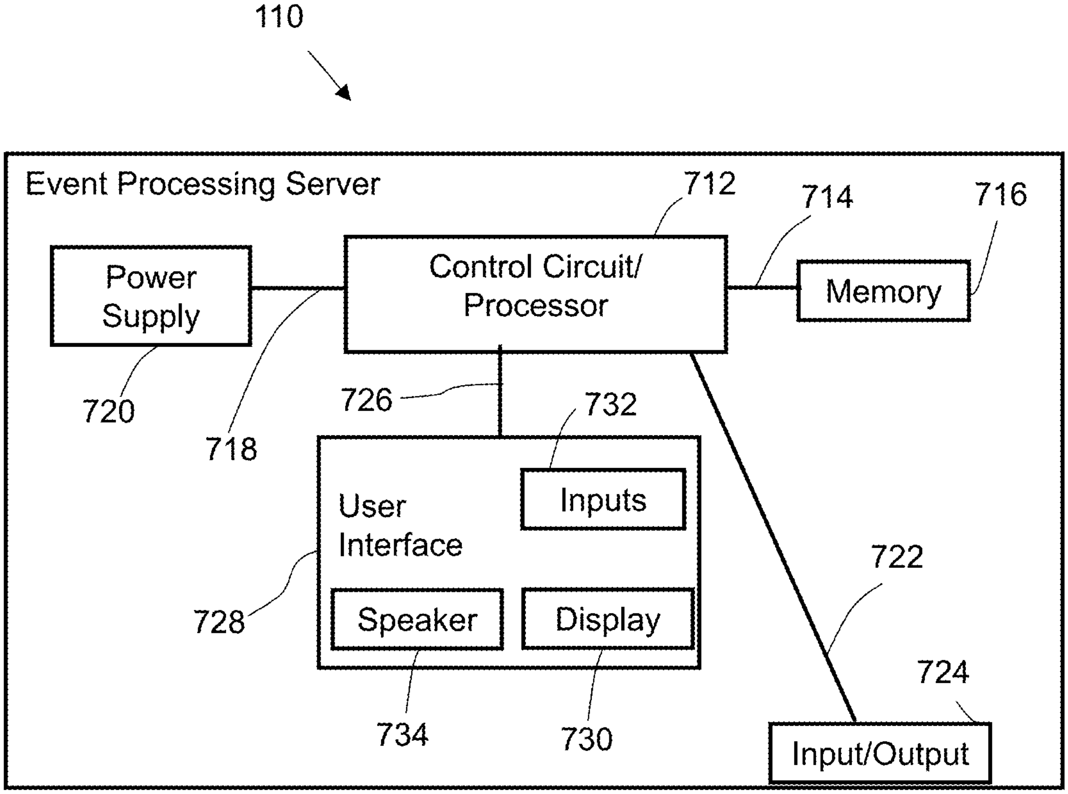
FIG. 7 is a functional diagram of an exemplary server device usable with the system of FIG. 1 in accordance with some embodiments.

With reference to FIG. 7, an exemplary event processing server 110 configured for use with the systems and methods described herein may include a control circuit 712 including a processor (for example, a microprocessor or a microcontroller) electrically coupled via a connection 714 to a memory 716 and via a connection 718 to a power supply 720. The control circuit 712 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 710 of the server 110 can be configured (for example, by using corresponding programming stored in the memory 716 as will be well understood by those skilled in the art) to carry out one or more of the steps, actions, and/or functions described herein. In some embodiments, the memory 716 may be integral to the processor-based control circuit 712, or can be physically discrete (in whole or in part) from the control circuit 712 and is configured to non-transitorily store the computer instructions that, when executed by the control circuit 710, cause the control circuit 712 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 712 of the server 110 is electrically coupled via a connection 722 to an input/output 724 that can receive signals from electronic devices in communication over the network 120 with the server 110 (e.g., data from the communication device 140 representing an emergency alert submitted by the user of the communication (i.e., electronic) device 140 via the first graphical interface 144). The input/output 724 of the server 110 can also send signals to other electronic devices of the system 100 over the network 120 (e.g., transmitting, to the electronic database 130, the data received from the communication device 140 indicative of the emergency alert; transmitting to the communication device 150, data indicative of an emergency alert notification based on the emergency alert generated by the user of the communication device 140).

In the embodiment shown in FIG. 7, the processor-based control circuit 712 of the server 110 is electrically coupled via a connection 726 to a user interface 728, which may include a visual display or display screen 730 (e.g., LED screen) and/or button input 732 that provide the user interface 728 with the ability to permit an operator of the server 110 to manually control the server 110 by inputting commands via touch-screen and/or button operation and/or voice commands. It will be appreciated that the performance of such functions by the processor-based control circuit 712 of the server 110 is not dependent on a human operator, and that the control circuit 712 may be programmed to perform such functions without a human operator. The server 110 may also include a speaker 734, which may generate audible signals/alerts to the user.

In some embodiments, the display screen 730 of server 110 is configured to display various graphical interface-based menus, options, and/or notifications/alerts that may be transmitted to the server 110 and displayed on the display screen 730 in connection with various aspects of the emergency alert notifications and their associated incident reports. The inputs 732 of the server 110 may be configured to permit a user to navigate through the on-screen menus on the server 110. It will be appreciated that the display screen 730 may be configured as both a display screen and an input 732 (e.g., a touch-screen that permits an operator to press on the display screen 730 to enter text and/or execute commands.)

It is noted that the communication devices 140, 150 described herein can have a similar architecture as the server illustrated in FIG. 5. For example, the communication devices 140 and 150 have installed computer program code (e.g., the applications 141 and 151) stored in memory 716 and executed by a control circuit or processor 712 to provide the functionality described herein. The execution of the applications can drive the user interface 728, e.g., to cause graphical interfaces to be displayed on the display 730 and receive inputs via the input 732, and drive audio output at the speaker 732. The communication devices likewise have various input/outputs 724 and a power supply 720.

As mentioned above, in some embodiments, in response to receipt of the emergency alert signal from the communication device 140, the control circuit 712 of the event processing server 110 is programmed to identify the workers associated with the retail facility to whom a notification of the emergency event at the retail facility is to be sent. To that end, in some embodiments, the control circuit 712 may include or be coupled to an emergency notification engine 115 that is configured to obtain the identifying data associated with each of the workers who are logged in other otherwise accounted for as being on-site at the retail facility where the emergency event is occurring, and to process this identifying data (which may include a profile and/or title of each worker) to identify the workers associated with the retail facility to whom a notification of the emergency event ongoing/or that just happened at the retail facility is to be sent by the server 110.

In one aspect, the control circuit 712 and/or the emergency notification engine 115 may cause the server 110 to obtain, from the electronic database 130, electronic data representing a complete list of the workers who are and/or who are not located at the retail facility at a time of the emergency event, and by determining which of the workers located and/or not located at the retail facility are classified at a title/user access level (e.g., department manager, store manager, director, etc.) that qualifies the workers to be sent, by the event processing server 110, the electronic notification indicative of the ongoing emergency event at the retail facility. By the same token, after obtaining, from the electronic database 130, electronic data representing a complete list of the workers who are located and/or not located at the retail facility at a time of the emergency event, the control circuit 712 of the server 110 is programmed to determine which of the workers located and/or not located at the retail facility are classified at a title/user access level (e.g., associate, senior associate, etc.) that does not qualify the workers to receive the notification indicative of the ongoing emergency event at the retail facility.

Figure 8:
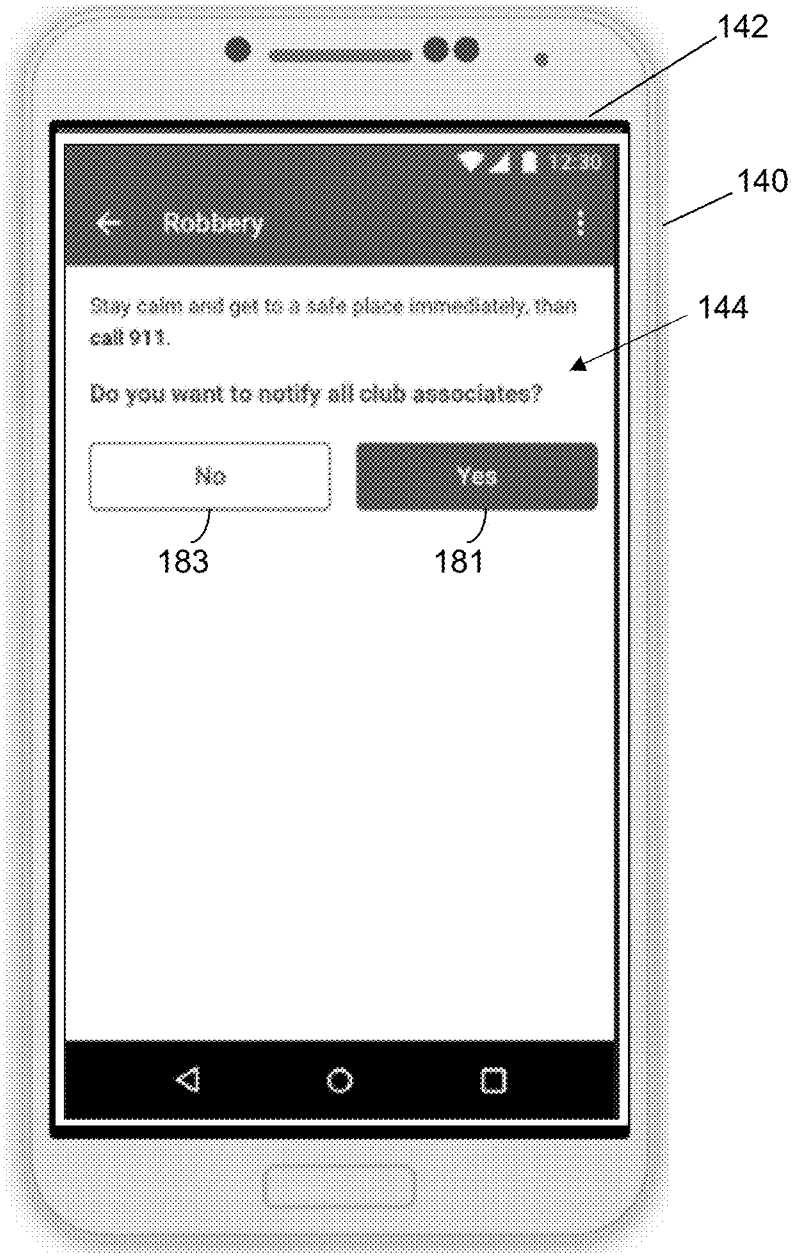
FIG. 8 depicts a communication device displaying a user interface portion associated with the first graphical interface of FIG. 6 in accordance with some embodiments.

Notably, in some embodiments, to accommodate for certain urgent and/or dangerous emergencies, the application 141 (e.g., mobile app) that runs on the communication device 140 may be configured to not rely on the determination of the control circuit 712 and/or emergency notification engine 115 as to which workers located at the retail facility are to be notified of an emergency in-progress. For example, with reference to FIG. 8, the user display portion of the first graphical interface 144 displayed on the screen 142 of the communication device 140 after the worker selects interactive icon **145*h* in FIG. 6 (i.e., Robbery) may include a graphical menu that present a graphical query to the worker as to whether the worker wants to notify all club associates (i.e., not just the workers selected by the server 110) of the ongoing Robbery by selecting the interactive icon/graphical element 181 (Yes), or if the worker does not want to notify all club associates of the ongoing Robbery by selecting the interactive icon/graphical element 183** (No).

After the control circuit 712 and/or the emergency notification engine 115 associated with the event processing server 110 identify which workers are in a class that qualifies them to receive an emergency notification and which workers are not, the control circuit 712 and/or the emergency notification engine 115 generates and causes the server 110 to transmit, over the network 120, a notification signal including a notification of an ongoing emergency event at the retail facility to a communication (i.e., electronic) device 150 of each of the workers identified by the server 110 as being the workers who fall into a title/user access classification that qualifies them to receive such an emergency notification.

Figure 9:
FIG. 9 depicts a communication device displaying a user interface portion associated with an exemplary second graphical interface generated by an application executable on the communication device and showing an emergency notification transmitter by the server in accordance with some embodiments.

In one aspect, as shown in FIG. 9, after the event processing server 110 transmits an emergency notification signal regarding an ongoing retail facility emergency over the network 120 to a communication device 150 of a worker determined by the server 110 to be within a class of workers (e.g., associate, senior associate, manager, senior manager, director, etc.) that qualifies for receiving the emergency notification signal, this notification signal causes the communication device 150 to display user display portion of a second graphical interface 154 that includes a visible graphical notification (which may be a push notification, short message service (SMS), etc.) indicative of (by providing brief information regarding) the ongoing emergency event (e.g., Tornado warning until 9:00 pm) affecting the retail facility (which may be identified by number and/or city and state of location) indicated in the graphical notification.

Figure 10:
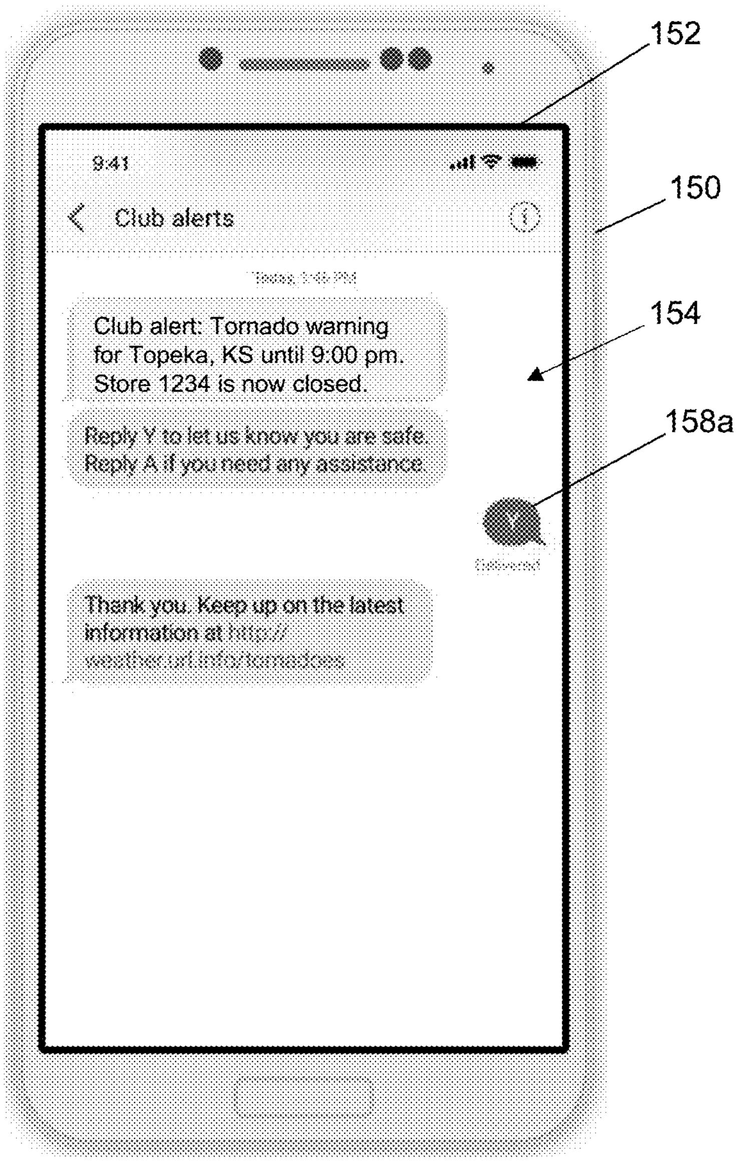
FIG. 10 depicts a communication device displaying a user interface portion associated with the second graphical interface of FIG. 9 in accordance with some embodiments.
Figure 11:
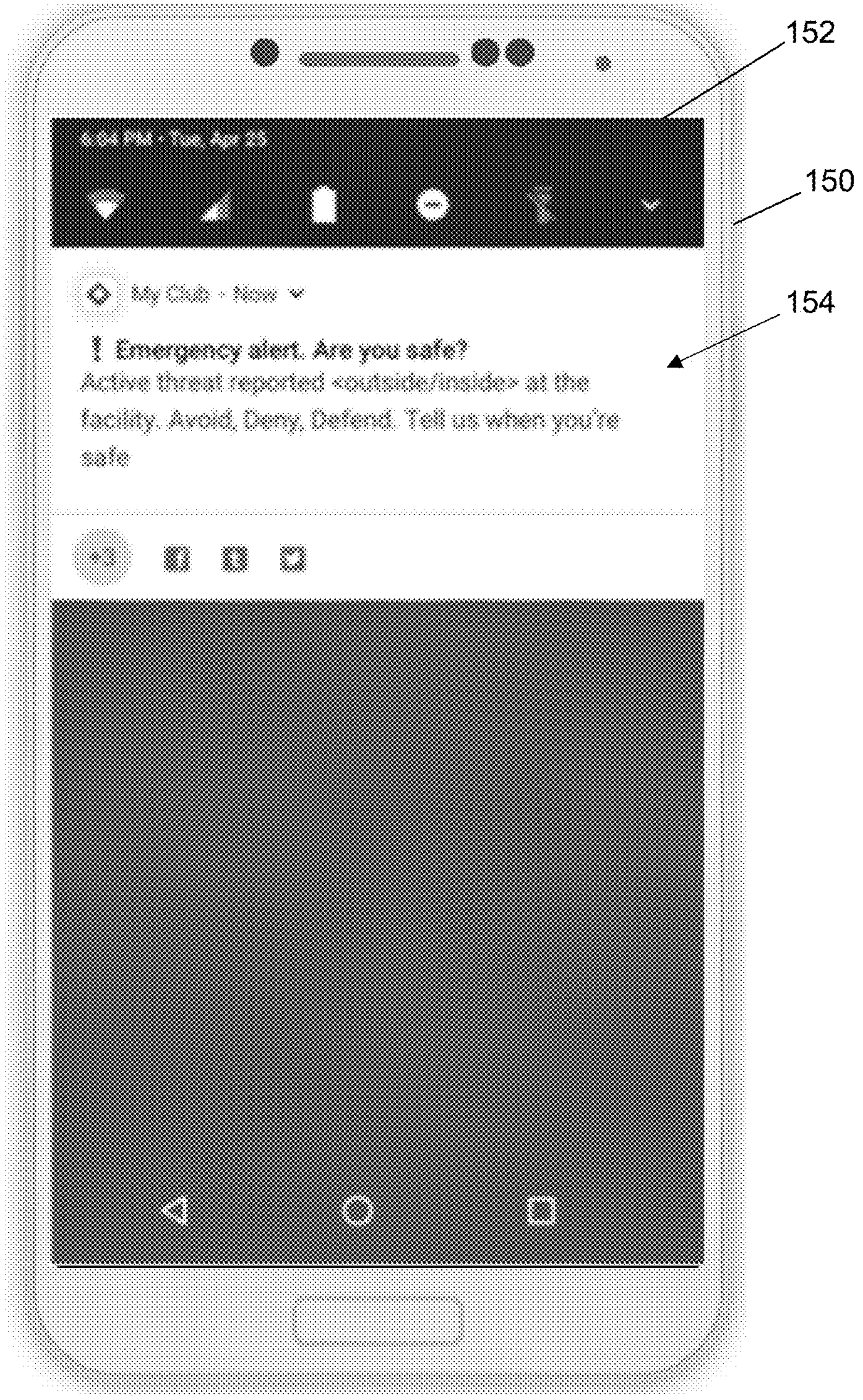
FIG. 11 depicts a communication device displaying another user interface portion associated with the second graphical interface of FIG. 9 in accordance with some embodiments.
Figure 12:
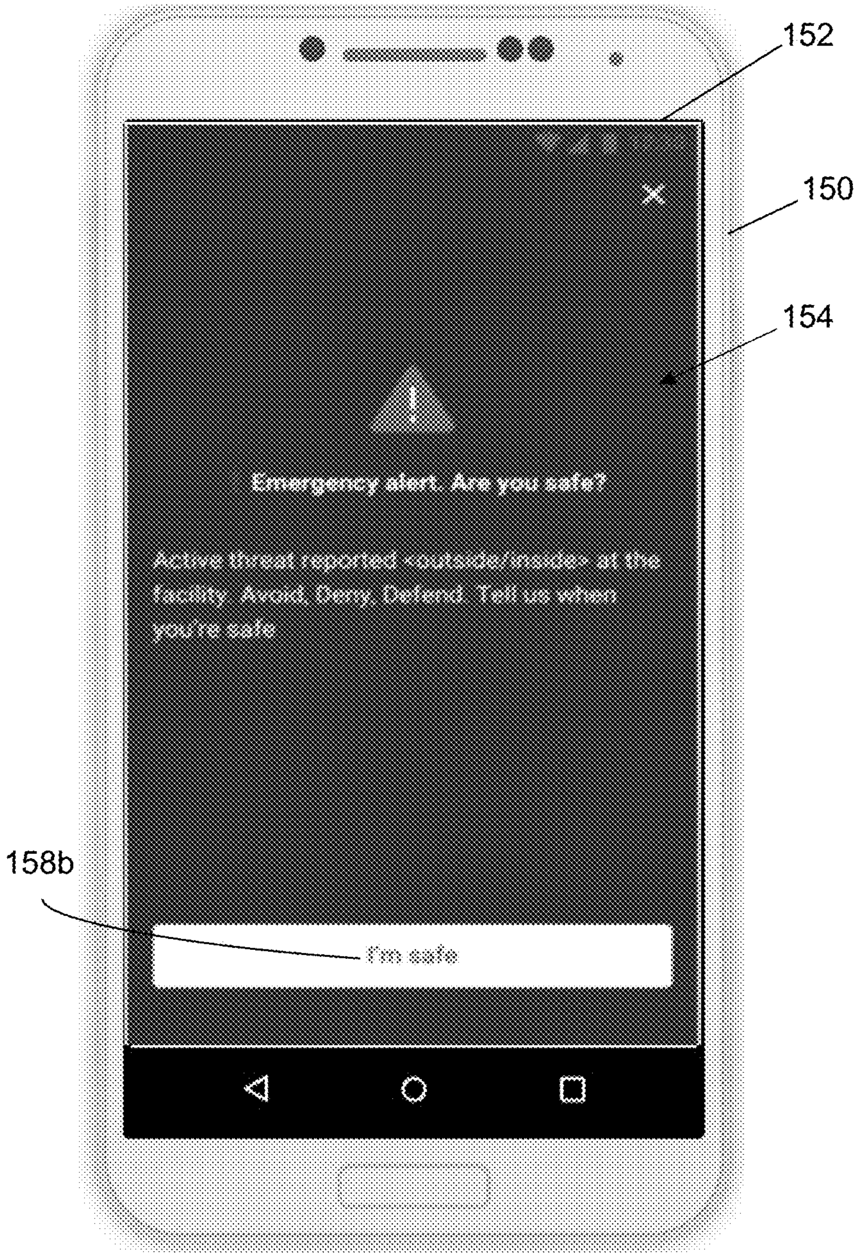
FIG. 12 depicts a communication device displaying a user interface portion associated with the second graphical interface of FIG. 11 in accordance with some embodiments.
Figure 13:
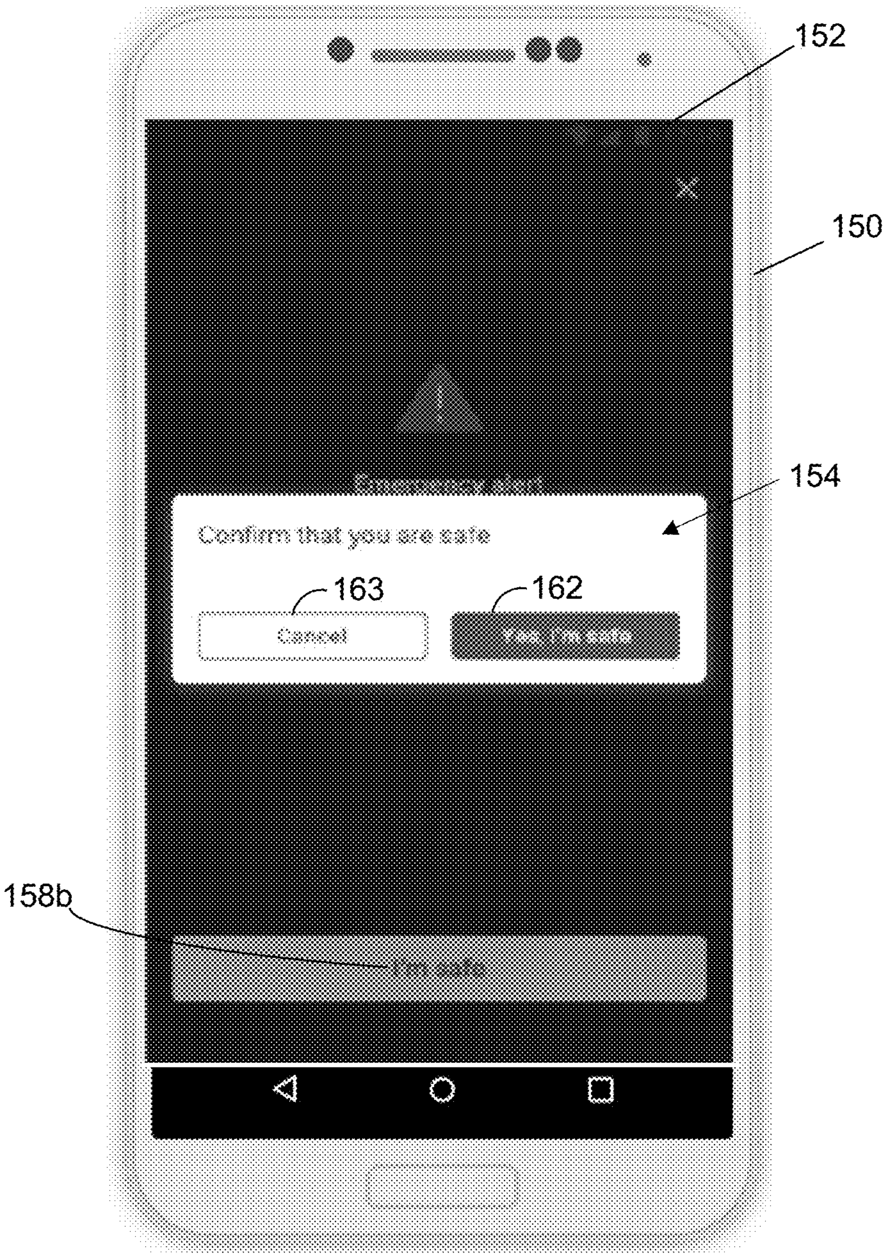
FIG. 13 depicts a communication device displaying a user interface portion associated with the second graphical interface of FIG. 12 in accordance with some embodiments.
Figure 14:
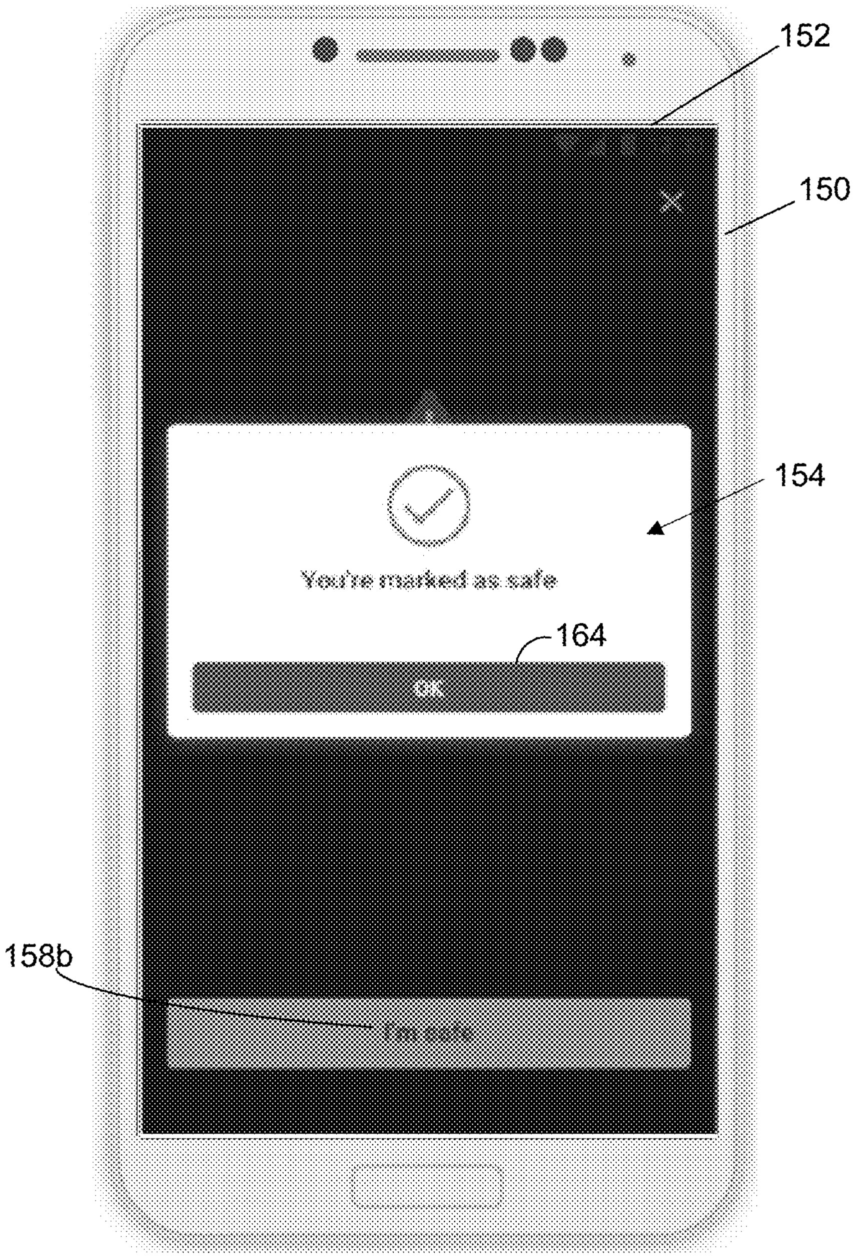
FIG. 14 depicts a communication device displaying a user interface portion associated with the second graphical interface of FIG. 13 in accordance with some embodiments.

In some embodiments, as shown in FIG. 10, a user display portion of the second graphical interface 154 may include a text input field **158*a* that permits each of the workers identified by the server 110 for receiving the emergency notification to respond to a safety query by way of a text message, which indicates whether the worker is safe (answer Yin FIG. 10) or not (answer A in FIG. 10). In certain embodiments, after the communication device 150 receive the emergency notification signal from the server 110 and displays on the screen 152 a user display portion of the second graphical interface 154 as shown in FIG. 11 to inform the worker of the emergency alert and ask whether the worker is safe, the worker's interaction with the screen 152 causes the second graphical interface 154 to advance to the user display portion or screen shown in FIG. 12, where the worker is not only presented with an on-screen indication of the ongoing emergency, but the second graphical interface includes an interactive icon 158*b* (I'm Safe), which permits the worker to confirm whether the worker is safe. Optionally, after the worker interacts with icon 158*b* visible in FIG. 12, a user display portion of the second graphical interface 154 generates a pop-up menu (shown in FIG. 13) that asks the worker to either confirm that the worker is safe (by selecting interactive icon 162 (Yes, I'm Safe), or by canceling the initial I'm Safe indication (by selecting interactive icon 163). In other words, when the worker interacts with icon 162, the communication device 150 causes the communication device 150 to transmit a signal back to the server 110 indicating that the worker is safe, and the second graphical interface generates an on-screen pop-up message menu (shown in FIG. 14) indicating that the worker has been marked as safe, presenting the worker with an interactive icon 164** (OK), which permits the worker to close this pop-up message menu.

As mentioned above, in some embodiments, in response to receipt of the emergency alert signal from the communication device 140 regarding an ongoing emergency at a retail facility, the control circuit 712 of the event processing server 110 is programmed, in addition to generating an electronic emergency alert notification to be transmitted to one or more communication devices 150, to generate electronic data representative of a modifiable incident report in association with the ongoing emergency event that was reported by a user of the communication device 140. In one aspect, after this incident report is generated, the server 110 transmits the report over the network 120 to the electronic database 130 for storage and future retrieval and/or modification.

In some aspects, the control circuit 712 of the server 110 may be programmed to transmit the incident report over the network 120 to one or more of a computing device of an emergency operations center associated with the retail store and/or city emergency personnel associated with a geographic area where the retail store is located. In some embodiments, the control circuit 712 of the event processing server 110 may include or be coupled to an incident report engine 125 that is configured to generate the electronic data representative of the incident report and/or to modify this electronic data when a user of a communication device 140 subsequently modifies/updates the data (e.g., written description of the incident) in the initial incident report.

Figure 15:
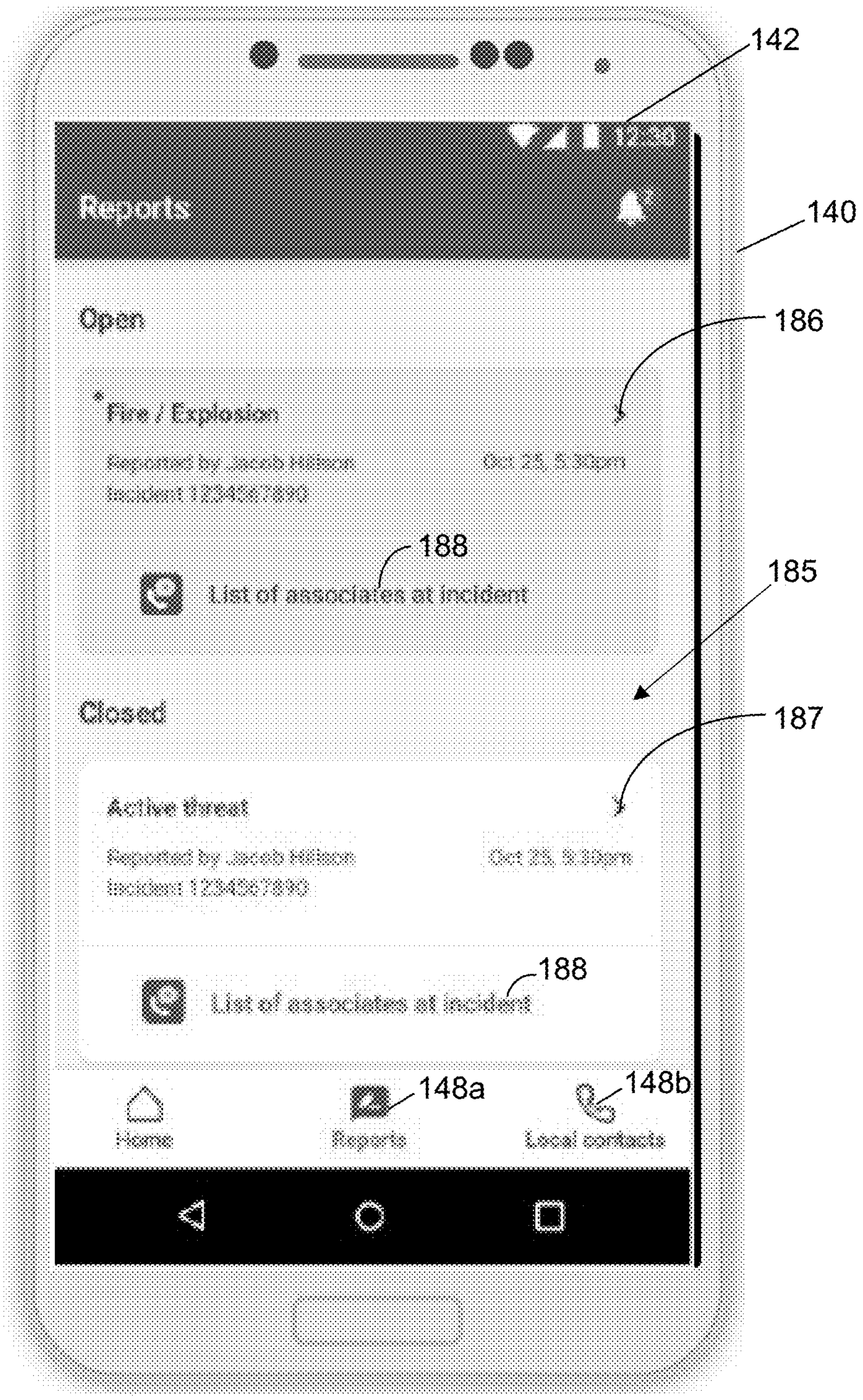
FIG. 15 depicts a communication device displaying a user interface portion associated with an exemplary third graphical interface generated by an application executable on the communication device and showing various user-selectable icons associated with various aspects of viewing/modifying incident reports in accordance with some embodiments.

With reference to FIG. 15, the application 141 executable on the communication device 140 may be used by the user (e.g., manager) of a retail facility to bring up a list of incident reports previously generated based on emergency alerts generated at the retail facility. In some aspects, when a user interacts with the icon 148*a* entitled Reports in FIG. 6, the user's action causes the communication device 140 to transmit, over the network 120 (directly or via the server 110), a query to the electronic database 130, and in response, obtain from the electronic database 130 electronic data representing one or more incident reports stored in the electronic database 130 in association with the retail facility. FIG. 15 shows an example of a user display portion of a third graphical interface 185, which is configured to permit the worker to view the modifiable incident report, update information in the modifiable incident report, and save the modifiable incident report including the information updated by the worker in the electronic database 130.

With reference to FIG. 15, the third graphical interface 185 may include an interactive icon 187 that permits the worker to view and/or update the details of emergency reports that are now officially closed and an interactive icon 186 that permits the worker to view and/or update the details of emergency reports that are still actively open. As shown in FIG. 15, the exemplary third graphical interface 185 may include interactive icons 188, which permits the worker to view a list of retail facility associates involved in the reported incident. If, for example, the worker were to interact with the icon 188 in FIG. 15, the third graphical interface 185 would proceed to the screen shown in FIG. 16, where a user display portion of the third graphical interface 185 includes a list of the workers that are clocked in at the retail facility, as well as interactive icons 189*a*, 189*b* associated with the workers to enable the user of the communication device 140 to make one or more of the workers as safe.

Figure 16:
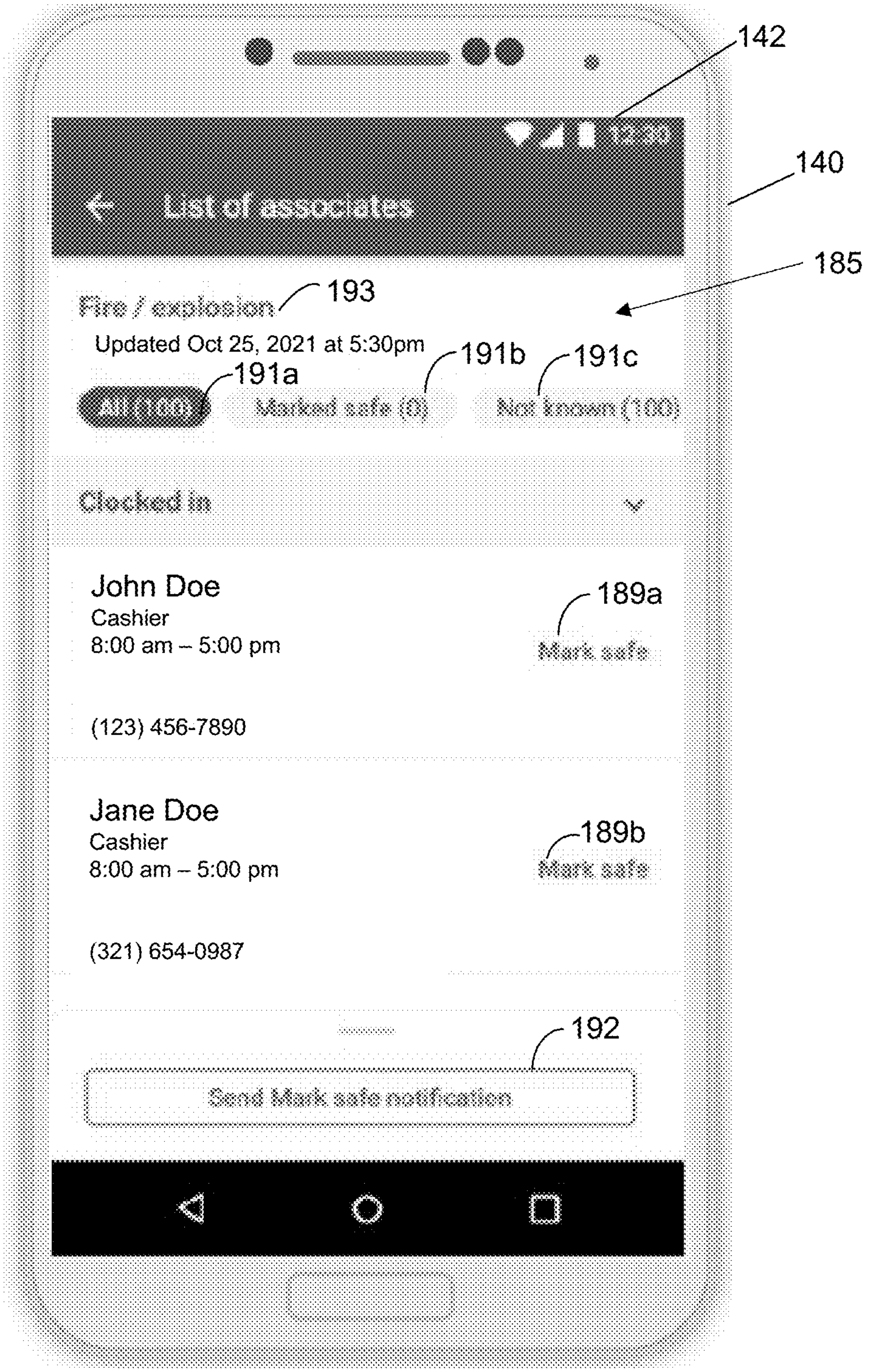
FIG. 16 depicts a communication device displaying a user interface portion associated with the third graphical interface of FIG. 15 in accordance with some embodiments.

As can be seen in FIG. 16, the list of workers in the exemplary third graphical interface 185 may include the position of each worker (both workers are cashiers in the illustrated example), the working hours of each worker, and the contact number of each worker. In the example shown in FIG. 16, the third graphical interface also include a graphical element/icon 193 indicating the nature of the emergency incident at the retail facility (i.e., Fire/Explosion), as well as graphical elements/icons 191*a*, 191*b*, and 191*c*, which indicate the total number of workers at the facility (e.g., both clocked in and off-site), the number of workers marked safe, and the number of workers whose safety status is unknown, respectively. The exemplary graphical interface 193 further includes an interactive icon 192 (Send Mark Safe Notification), which transmits, to the communication device 150 of a worker selected by the user of the communication device 140, a Mark Safe Notification, which causes a pop-up within the second graphical interface 154 of the worker's communication device 150 (see FIG. 11) and requires the worker to respond by either marking himself/herself safe (see FIG. 12) or requesting assistance. In one embodiment, after the worker interacts with the interactive icon 192 in FIG. 16, a user display portion of the third graphical interface 185 proceeds to the menu shown in FIG. 17, where the interactive icon 192 (Send Mark Safe Notification) is replaced with an informational icon 194 (which may be interactive), and which indicates to the user of the communication device 140 that the workers selected by the user for mark me safe verification has been transmitted to the communication devices 150 of these workers.

Figure 17:
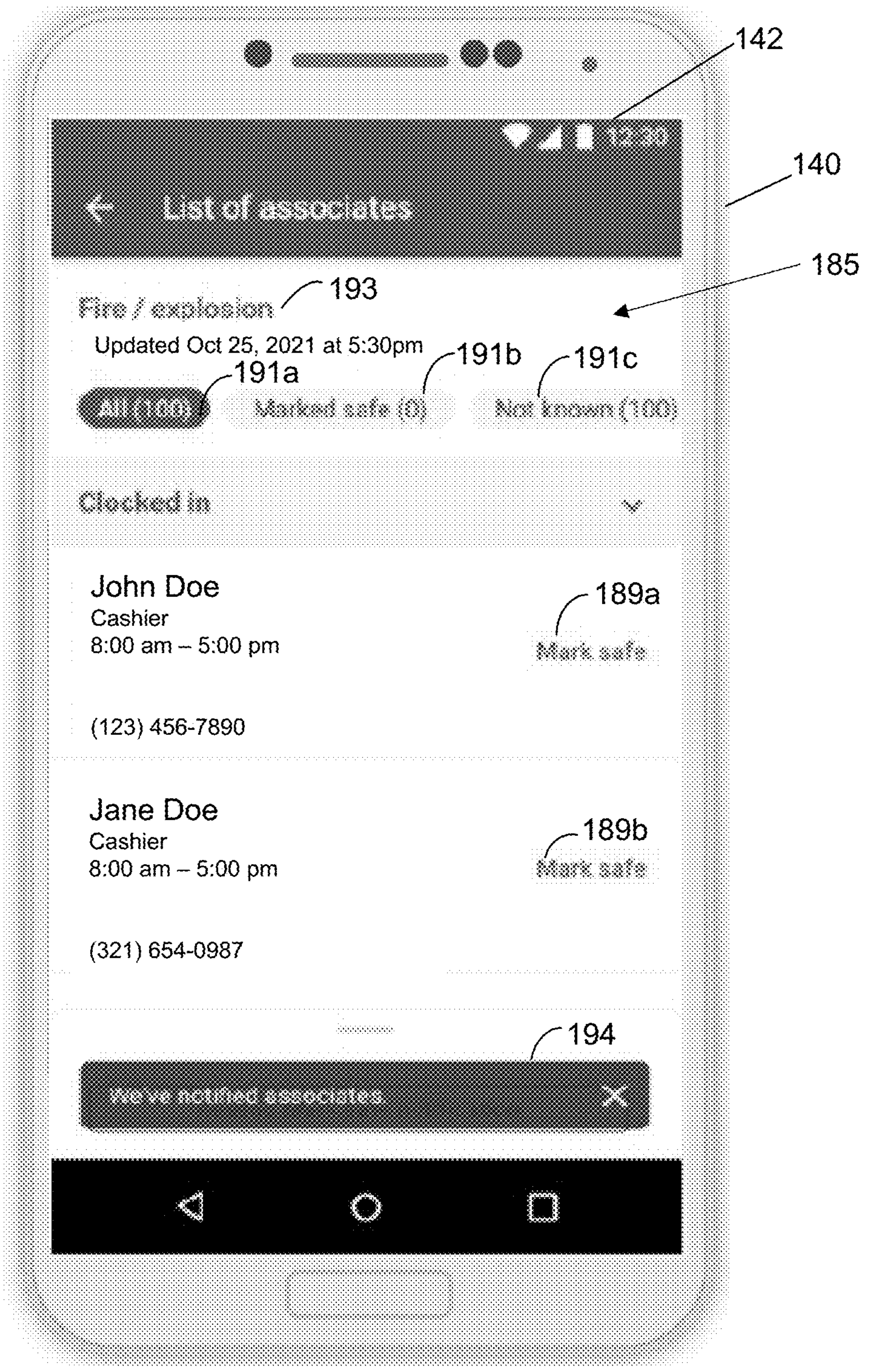
FIG. 17 depicts a communication device displaying a user interface portion associated with the third graphical interface of FIG. 16 in accordance with some embodiments.
Figure 18:
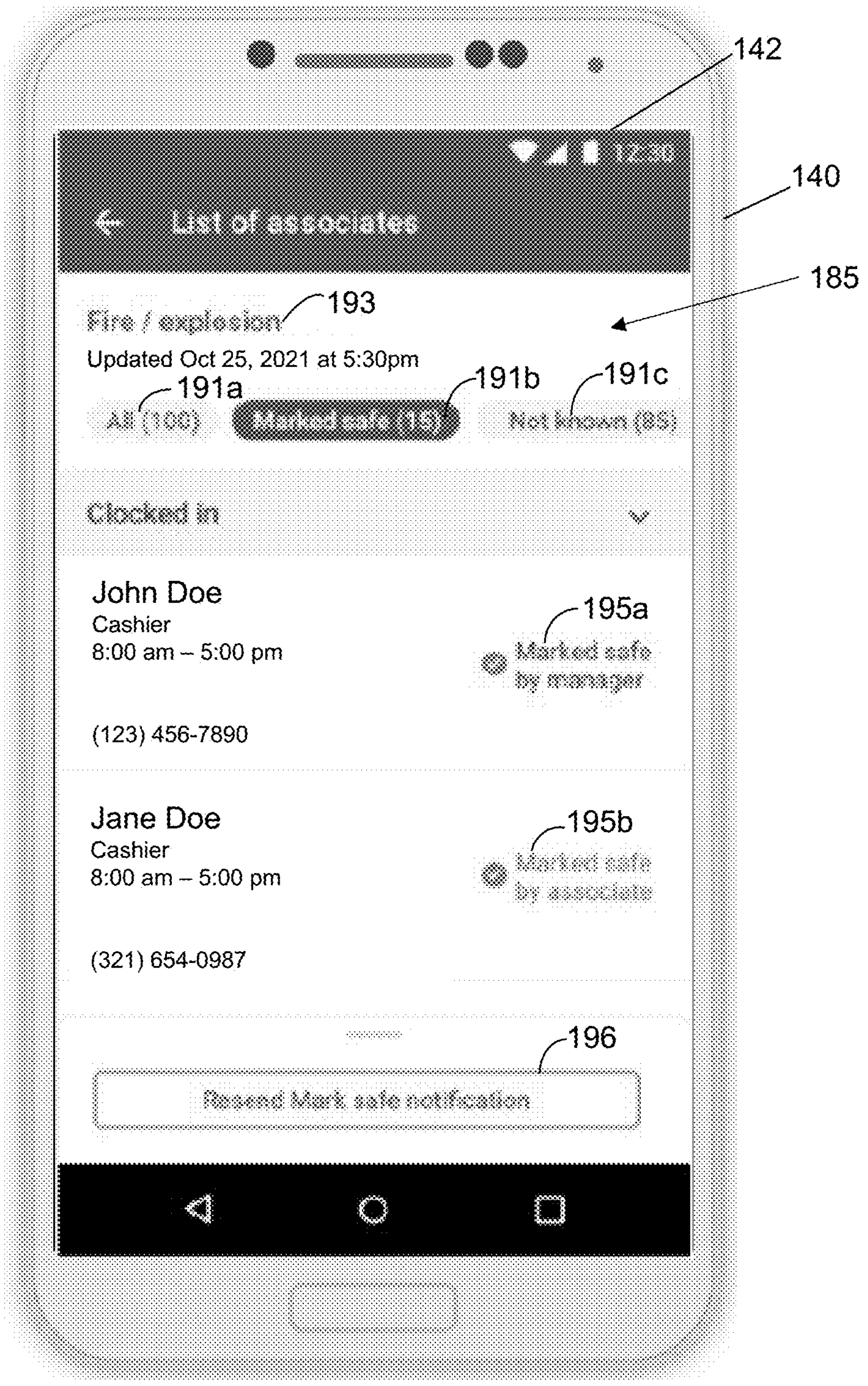
FIG. 18 depicts a communication device displaying a user interface portion associated with the third graphical interface of FIG. 17 in accordance with some embodiments.

FIG. 18 shows an exemplary configuration of a user display portion of the third graphical interface 185 after one of the workers (i.e., John Doe) has used his communication device 140 to respond to the Mark Me Safe Notification by indicating that he is safe, and the after the user of the communication device 150 (i.e., manager) has marked John Doe safe by clicking the interactive icon 189*a* within the third graphical interface 185 of FIG. 17. FIG. 18 shows an exemplary configuration of the third graphical interface 185 after the user of the communication device 150 (i.e., manager) has marked John Doe safe (as indicated by the icon 195*a*) based on the text message response keyed in by John Doe into the graphical interface 154 in FIG. 10, and after one of the workers (i.e., Jane Doe) has used her communication device 140 to respond to the Mark Me Safe Notification by indicating that she is safe (as indicated by icon 195*b*).

Figure 19:
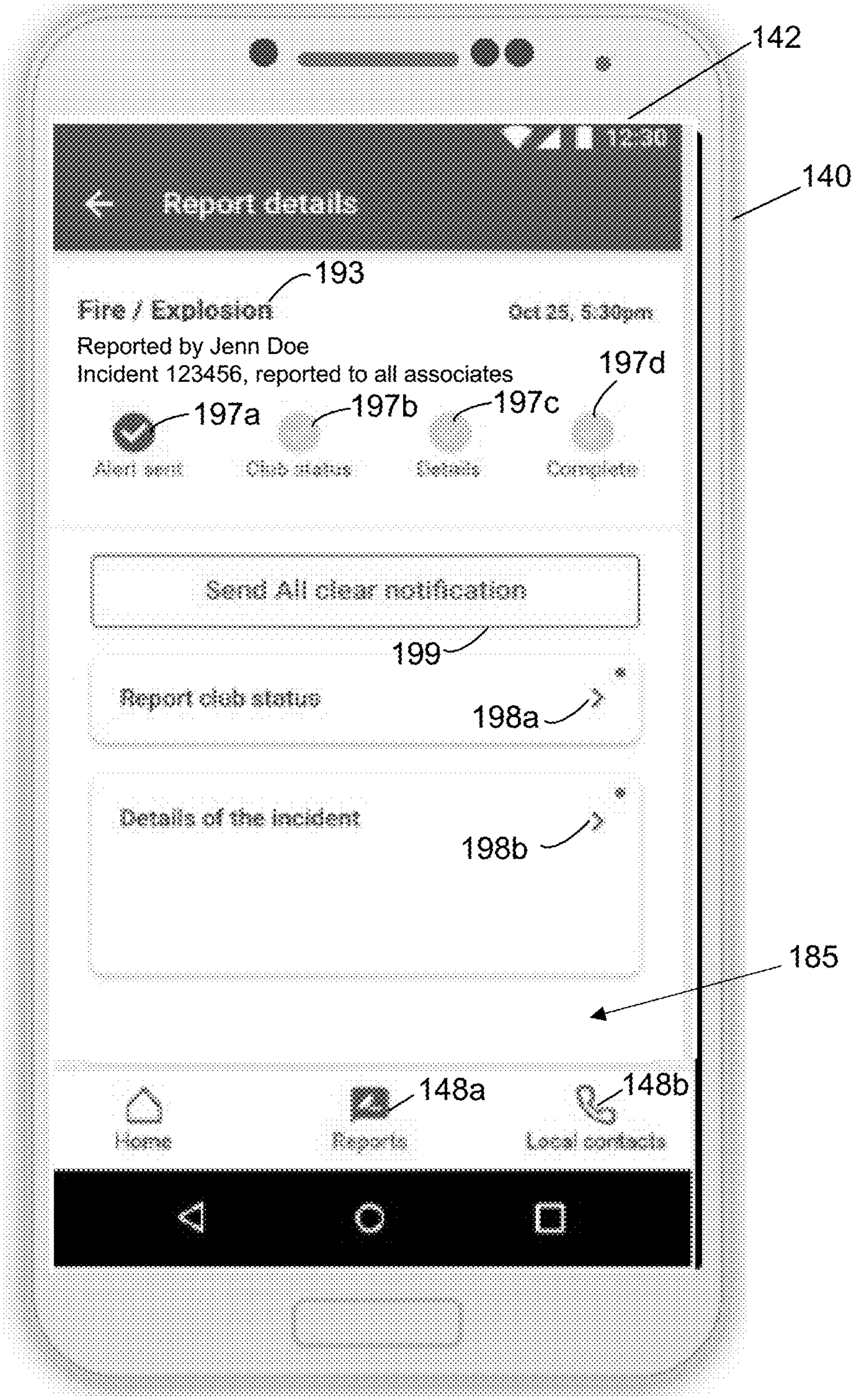
FIG. 19 depicts a communication device displaying a user interface portion associated with the third graphical interface of FIG. 15 in accordance with some embodiments.

With reference back to FIG. 15, if the user of the communication device 140 (e.g., manager) were to interact with the icon 186, the third graphical interface 185 would proceed to the screen shown in FIG. 19, where a user display portion of the third graphical interface 185 includes a list of the workers that are clocked in at the retail facility, as well as interactive icons 189*a*, 189*b* associated with the workers to enable the user of the communication device 140 to make one or more of the workers as safe. The exemplary third graphical interface 185 in FIG. 19 shows a graphical icon 197*a* indicating whether an emergency alert was already sent by the reporting worker (with the checkmark indicating that an emergency alert was in fact sent).

Figure 20:
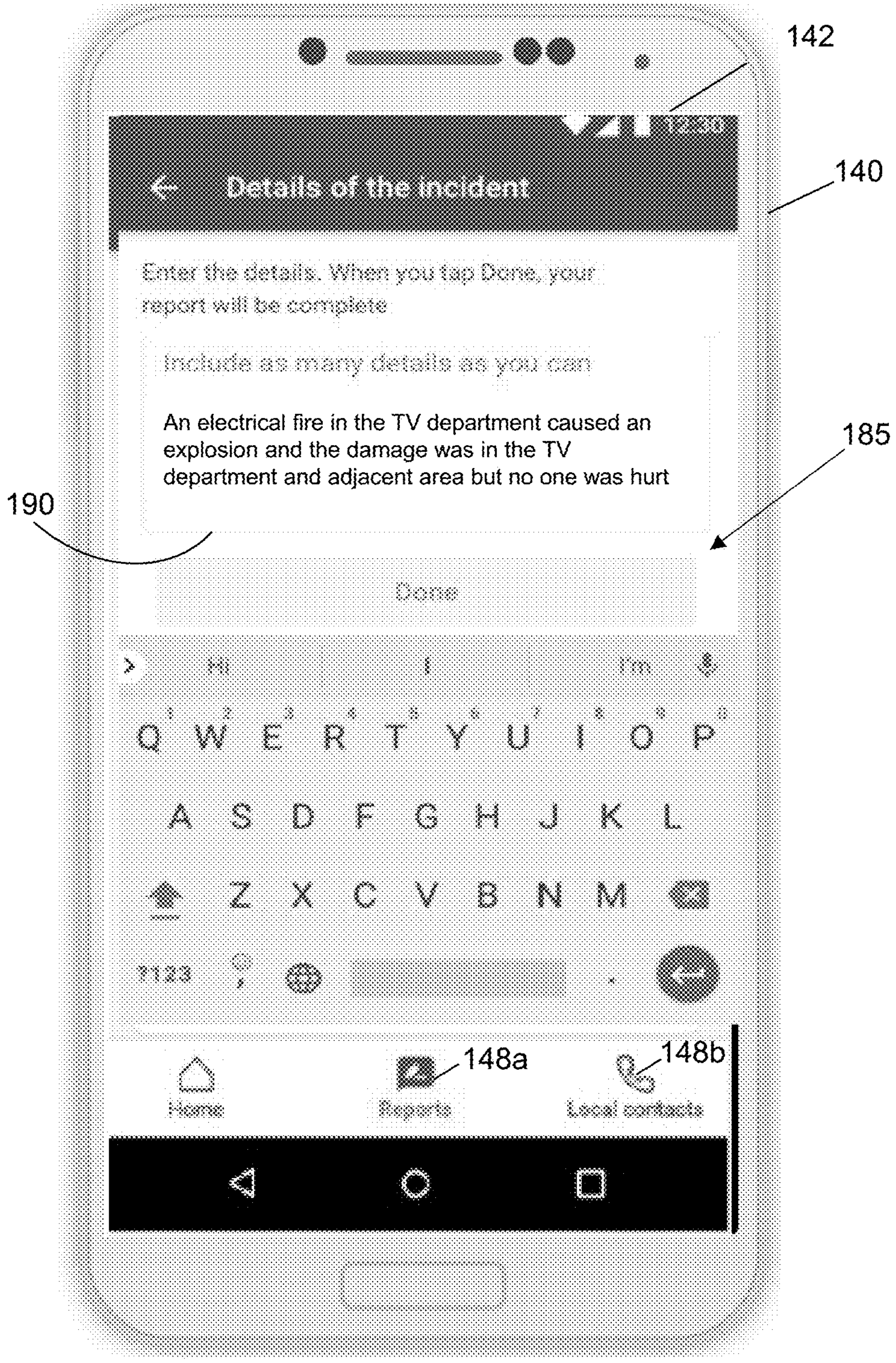
FIG. 20 depicts a communication device displaying a user interface portion associated with the third graphical interface of FIG. 15 in accordance with some embodiments.

The third graphical interface 185 in FIG. 19 further includes a graphical icon 197*c* indicating whether the details of the incident that resulted in the emergency alert to be sent have been provided by the originally reporting worker or anyone else (i.e., a checkmark would indicate that the details have been provided). The third graphical interface 185 also includes a graphical icon/selectable field 198*b* which, if interacted with by the worker (e.g., retail facility manager), causes the third graphical interface 185 to generate an input field 190 as shown in FIG. 20 that permits the worker to provide a written description of the emergency incident.

In some aspects, after the worker inputs the details of the emergency incident, the third graphical interface 185 causes the communication device 140 to transmit a signal (directly or via the server 110) to the electronic database 130, such that the electronic database 130 is updated to include electronic data reflective of an updated incident report (i.e., including the newly-entered details), which may be subsequently retrieved, viewed and/or modified, for example, by the worker of the retail facility using the application on the worker's communication device 140, or by a worker at an emergency operations facility using a desktop computer or another electronic device (which may or may not have the same application installed as the application installed on communication device 140). After the worker inputs the details of the emergency incident and selects/clicks "Done," the third graphical interface 185 proceeds to the configuration shown in FIG. 21, where it is refreshed to include the details of the emergency alert-causing incident within the field associated with interactive icon 198*b* and called "Details of the Incident."

Figure 21:
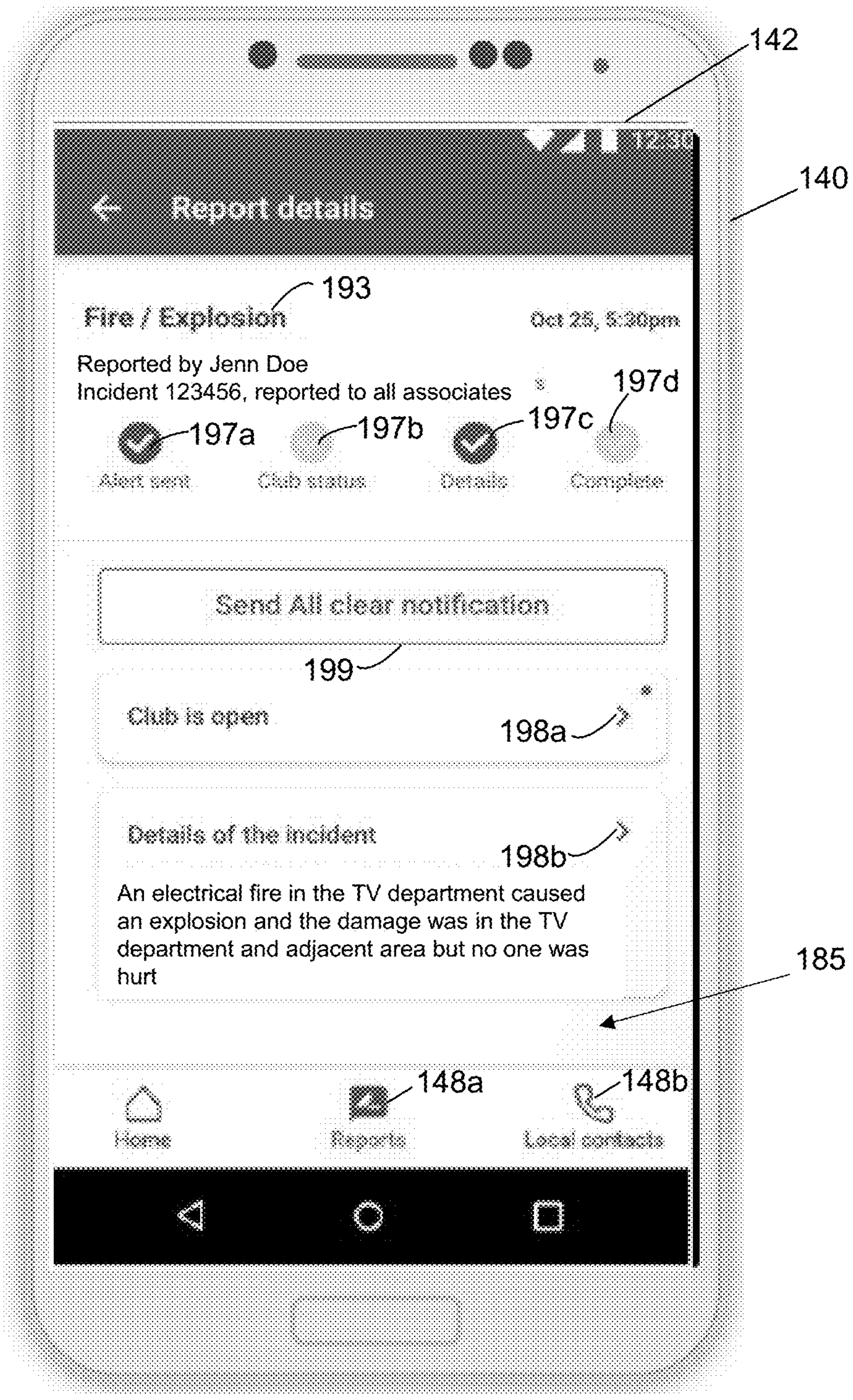
FIG. 21 depicts a communication device displaying a user interface portion associated with the second graphical interface of FIG. 20 in accordance with some embodiments.

The user display portion of the third graphical interface 185 shown in FIG. 19 includes a graphical icon 197*b* indicating the status of the retail facility (e.g., whether the retail facility remains open or is now closed). The third graphical interface 185 also includes a graphical icon/selectable field 198*a* which, if interacted with by the worker (e.g., retail facility manager), permits the worker to indicate (e.g., by selecting from two alternative dropdown options) whether the retail facility is open or closed, as shown in FIG. 21. In some aspects, when the worker selects the option indicating that the retail facility is closed within the field 198*a*, the third graphical interface 185 causes the communication device 140 to transmit a signal (directly or via the server 110) to the electronic database 130, such that the electronic database 130 is updated to include electronic data reflective of the worker's selection in field 198*a* and whether the retail facility remains open or is closed.

The user display portions of the third graphical interface 185 shown in FIGS. 19 and 21 further includes a graphical icon 197*d* indicating whether the incident report is complete or not (with a checkmark indicating that the incident report has been fully completed by the worker). In addition, the exemplary third graphical interface 185 includes an interactive element/icon 199 (Send All Clear Notification), which, when pressed, causes the communication device 140 to transmit a signal (e.g., to the event processing server 110, electronic database 130, a computing device at the emergency operations center, a computing device at a city emergency service, etc.) indicating that the emergency which caused the emergency alert to be generated has been resolved/cleared.

Figure 22:
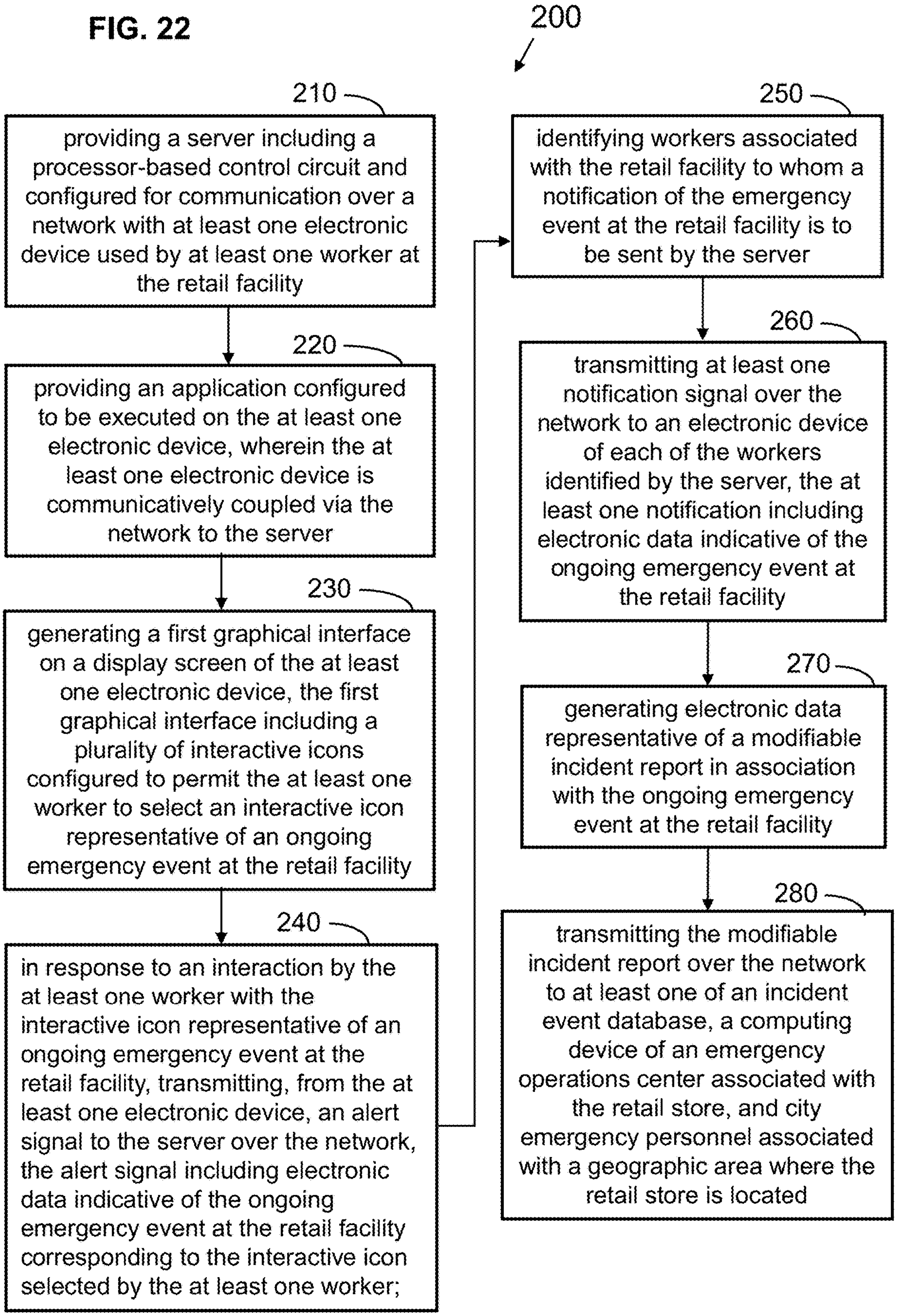
FIG. 22 is a flow chart diagram of a process of generating employee notifications and incident reports in association with emergency events at a retail facility in accordance with some embodiments.

FIG. 22 shows an embodiment of an exemplary method 200 of generating notifications and incident reports in connection with emergency events at a retail facility. The method 200 includes providing server 110 including a processor-based control circuit 712 and configured for communication over a network 120 with one or more electronic devices (e.g., communication devices 140 and 150) used by one or more workers (e.g., directors, managers, associates, etc.) at a retail facility (step 210). As mentioned above, the server 110 may be a single computer or a network of multiple computers and may be implemented as a device that is separate from the electronic database 130, or as a single device that includes both the server 110 and the electronic database 130.

The method 200 further includes providing an application 141, 151 (e.g., via a mobile app, an executable application, a URL link to a remote device, etc.) configured to be executed on the communication devices 140, 150, which communication devices 140, 150 are communicatively coupled via the network 120 to the server 110 (step 220). When a user of a communication device 140 launches the application 141 on a screen 142 of the communication device 140, the method 200 also includes generating portions of a first graphical interface 144 on a display screen 142 of the communication device 140 and this first graphical interface 144 includes a plurality of interactive icons 145*a*-145*n* configured to permit the worker to select one of the interactive icons 145*a*-145 that corresponds to the ongoing emergency event at the retail facility (step 230).

In response to the interaction by the worker with the interactive icon 145*a*-145*n* representative of the ongoing emergency event at the retail facility, the method 200 proceeds by transmitting, from the communication device 140, an alert signal to the server 110 over the network 120, and this alert signal includes electronic data indicative of the ongoing emergency event at the retail facility which corresponds to the interactive icon selected by the worker (step 240). Then, in response to receipt of the alert signal from the communication device 140 by the server 110, the next action in the method 200 is identifying the workers associated with the retail facility to whom a notification of the emergency event at the retail facility is to be sent by the server 110 (250).

As mentioned above, in some embodiments, the control circuit 712 of the server 110 may include or be coupled to an emergency notification engine 115 that is configured to obtain the identifying data associated with each of the workers who are logged in other otherwise accounted for as being on-site at the retail facility where the emergency event is occurring, and to process this identifying data (which may include a profile and/or title of each worker) to identify the workers associated with the retail facility to whom a notification of the emergency event ongoing/or that just happened at the retail facility is to be sent by the server 110. In particular, In one aspect, the control circuit 712 and/or the emergency notification engine 115 causes the server 110 to obtain, from the electronic database 130, electronic data representing a complete list of the workers who are and/or who are not located at the retail facility at a time of the emergency event, and determines (e.g., based on business rules indicating which classes or workers meet the threshold access level) which of the workers located and/or not located at the retail facility are qualified (and which workers are not qualified) to receive, from the event processing server 110, the electronic notification indicative of the ongoing emergency event at the retail facility.

After the server 110 and/or emergency notification engine 115 determines which workers located at and/or remotely to the retail facility meet the criteria (e.g., store manager or higher or department manager or higher) for receiving the emergency alert notification from the server 110, the method 200 further includes transmitting at least one notification signal including electronic data indicative of the ongoing emergency event at the retail facility over the network 120 to a communication device 150 of each of the workers determined by the server 110 to be qualified emergency alert recipients (step 260). As discussed above, the receipt of this notification signal transmitted from the server 110 over the network 120 to the communication device 150 causes the communication device 150 to display a graphical notification (e.g., push notification, SMS, etc.), and the interaction with this notification by the user of the communication device 150 causes the application 151 running on the communication device 150 to generate user display portions of a second graphical interface 154, which includes one or more interactive icons and/or input fields that permit the receiving the emergency notification and using the application to actively respond to the emergency notification within the second graphical interface 154 (e.g., mark the worker as safe or not safe) and/or to perform certain actions at the retail facility.

As pointed out above, after an emergency alert is submitted to the server 110 over the network 120 by a user having a suitable access level, the event processing server 110 processes this emergency alert and generates an incident report, which includes various details regarding the incident (e.g., details regarding the incident giving rise to the emergency alert, the time and place of the incident, the worker who submitted the emergency alert, etc.). This incident report may be transmitted by the server 110 to the electronic database 130 for storage, and the incident report may be accessible on the electronic database 130 later by a worker using the worker's communication device 140, 150 (or by a computing device user located at an emergency operations center associated with the retail facility) such that the worker of the retail facility (or the user at the emergency operations center) may view and/or modify (e.g., update) the incident report.

To that end, the method 200 includes generating electronic data representative of a modifiable incident report in association with the ongoing emergency event at the retail facility (step 270), and transmitting the modifiable incident report over the network 120 to at least one of the electronic database 130, a computing device of an emergency operations center associated with the retail store, and a computing device of city emergency personnel associated with a geographic area where the retail store is located (step 280). In some aspects, workers of the retail facility and/or an emergency operations center associated with the geographic region where the retail facility is located who are confirmed by the server 110 to be at or above a certain predetermined user access level would be permitted to access and/or modify the incident report via user display portions of a third graphical interface 185 on their communication device 140, while workers who are confirmed by the server 110 to be below the certain predetermined user access level (e.g., manager) would not be permitted to access and/or modify the incident report using their communication devices 140.

The systems and methods described herein provide for generation and distribution of emergency alert notifications to selected (or, optionally, to all) workers associated with a retain facility, as well as for automatic generation of incident reports which are transmitted to a database accessible by the emergency operations center associated with the retail facility where the emergency took place. These systems and methods obviate the need for retail store managers to spend countless hours on the phone with the associated emergency operation centers to report every emergency that took place in their retail stores and permit the workers at both the retail facility and the emergency operations center to access and modify the incident reports via a computing device without having to make another phone call. Accordingly, the systems and methods described herein advantageously improve worker efficiency at retail stores and provide for significant cost savings to the retailers operating such stores.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for use in connection with emergency events at a retail facility, the system comprising:

a server including a processor-based control circuit and configured for communication over a network with at least one electronic device used by at least one worker at the retail facility;

an application configured to be executed on the at least one electronic device, wherein the at least one electronic device is communicatively coupled via the network to the server, and wherein the application, when executed on the at least one electronic device, is configured to:

generate a first graphical interface on a display screen of the at least one electronic device, the first graphical interface configured to permit the at least one worker to select an ongoing emergency event at the retail facility and make a selection indicating a status of the worker;

wherein interaction by the at least one worker with the first graphical interface causes the at least one electronic device to transmit an alert signal to the server over the network, the alert signal including electronic data indicative of the ongoing emergency event at the retail facility;

wherein the server, in response to receipt of the alert signal from the at least one electronic device, is configured to generate electronic data representative of an incident report in association with the ongoing emergency event at the retail facility.

2. The system of claim 1, wherein the server, in response to receipt of the alert signal from the at least one electronic device, is configured to transmit at least one signal to at least one other electronic device, the at least one signal including an electronic notification of the ongoing emergency event at the retail facility;

wherein the at least one signal, when received by the at least one other electronic device, causes the at least one other electronic device to display a second graphical interface including the electronic notification indicative of the ongoing emergency event at the retail facility; and wherein the second graphical interface permits each worker of workers identified by the server for receiving the electronic notification to at least one of mark themselves safe and chat with emergency personnel.

3. The system of claim 2, wherein the processor-based control circuit is configured to identify workers associated with the retail facility to whom the electronic notification of the ongoing emergency event at the retail facility is to be sent by:

obtaining a complete list of the workers who are located at the retail facility at a time of the ongoing emergency event; and determining which of the workers located at the retail facility are classified at a level that qualifies to be sent the electronic notification indicative of the ongoing emergency event at the retail facility and which of the workers located at the retail facility are classified at a level that does not qualify to be sent the electronic notification indicative of the ongoing emergency event at the retail facility.

4. The system of claim 3, wherein the processor-based control circuit is configured to identify workers associated with the retail facility to whom the electronic notification of the emergency event at the retail facility is to be sent by:

obtaining a complete list of the workers who are not located at the retail facility at a time of the emergency event; and by determining which of the workers not located at the retail facility are classified at a level that qualifies to be sent the electronic notification indicative of the ongoing emergency event at the retail facility and which of the workers not located at the retail facility are classified at a level that does not qualify not to be sent the electronic notification indicative of the ongoing emergency event at the retail facility.

5. The system of claim 1, further comprising an incident event database communicatively coupled to the server over the network and configured to receive from the server and store the electronic data representative of the incident report associated with the ongoing emergency event at the retail facility; and wherein the application is configured to generate a third graphical interface on the display screen of the at least one electronic device, the third graphical interface being configured to permit the at least one worker to view the incident report, update information in the incident report, and save, in the incident event database, the incident report including the information updated by the at least one worker.

6. The system of claim 5, wherein the third graphical interface is configured such that the incident report stored in the incident event database is only accessible or modifiable by the at least one worker who is logged into the application only if the at least one worker logged into the application is at or above a predetermined access level.

7. The system of claim 1, wherein the ongoing emergency event that the at least one worker is permitted to select via the first graphical interface is at least one of: active threat, acts of violence, fire, explosion, injury, power failure, missing child, severe weather, person carrying a weapon, robbery, hazardous materials exposure, bomb threat, COVID-19 exposure, and retail store closure.

8. The system of claim 1, wherein the first graphical interface is configured such that the at least one worker is permitted to select the ongoing emergency event only when the at least one worker is logged into the application and only if the at least one worker logged into the application meets a predetermined access level.

9. The system of claim 1, wherein the first graphical interface is further configured to permit the at least one worker to directly contact city emergency personnel associated with a geographic area where the retail facility is located.

10. The system of claim 1, wherein the first graphical interface is further configured to permit the at least one worker to type in additional details regarding the ongoing emergency event at the retail facility.

11. A method of reporting of emergency events at a retail facility, the method comprising:

providing a server including a processor-based control circuit and configured for communication over a network with at least one electronic device used by at least one worker at the retail facility;

providing an application configured to be executed on the at least one electronic device, wherein the at least one electronic device is communicatively coupled via the network to the server;

generating a first graphical interface on a display screen of the at least one electronic device, the first graphical interface configured to permit the at least one worker to select an ongoing emergency event at the retail facility and make a selection indicating a status of the worker;

in response to an interaction by the at least one worker with the first graphical interface, transmitting from the at least one electronic device an alert signal to the server over the network, the alert signal including electronic data indicative of the ongoing emergency event at the retail facility; and in response to receipt of the alert signal from the at least one electronic device, generating, by the server, electronic data representative of an incident report in association with the ongoing emergency event at the retail facility.

12. The method of claim 11, further comprising:

in response to receipt of the alert signal from the at least one electronic device, transmitting, from the server, at least one signal to at least one other electronic device, the at least one signal including an electronic notification of the ongoing emergency event at the retail facility;

wherein the at least one signal, when received by the at least one other electronic device, causes the at least one other electronic device to display a second graphical interface including the electronic notification indicative of the ongoing emergency event at the retail facility; and wherein the second graphical interface permits each worker of workers identified by the server for receiving the electronic notification to at least one of mark themselves safe and chat with emergency personnel.

13. The method of claim 12, further comprising, by the processor-based control circuit, identifying workers associated with the retail facility to whom the electronic notification of the ongoing emergency event at the retail facility is to be sent by:

obtaining a complete list of the workers who are located at the retail facility at a time of the ongoing emergency event; and determining which of the workers located at the retail facility are classified at a level that qualifies to be sent the electronic notification indicative of the ongoing emergency event at the retail facility and which of the workers located at the retail facility are classified at a level that does not qualify to be sent the electronic notification indicative of the ongoing emergency event at the retail facility.

14. The method of claim 13, further comprising, by the processor-based control circuit, identifying workers associated with the retail facility to whom the electronic notification of the emergency event at the retail facility is to be sent by:

obtaining a complete list of the workers who are not located at the retail facility at a time of the emergency event; and by determining which of the workers not located at the retail facility are classified at a level that qualifies to be sent the electronic notification indicative of the ongoing emergency event at the retail facility and which of the workers not located at the retail facility are classified at a level that does not qualify not to be sent the electronic notification indicative of the ongoing emergency event at the retail facility.

15. The method of claim 11, further comprising:

providing an incident event database communicatively coupled to the server over the network and configured to receive from the server and store the electronic data representative of the incident report associated with the ongoing emergency event at the retail facility; and generating by the application a third graphical interface on the display screen of the at least one electronic device, the third graphical interface being configured to permit the at least one worker to view the incident report, update information in the incident report, and save, in the incident event database, the incident report including the information updated by the at least one worker.

16. The method of claim 15, wherein the third graphical interface is configured such that the incident report stored in the incident event database is only accessible or modifiable by the at least one worker who is logged into the application only if the at least one worker logged into the application is at or above a predetermined access level.

17. The method of claim 11, wherein the ongoing emergency event that the at least one worker is permitted to select via the first graphical interface is at least one of: active threat, acts of violence, fire, explosion, injury, power failure, missing child, severe weather, person carrying a weapon, robbery, hazardous materials exposure, bomb threat, COVID-19 exposure, and retail store closure.

18. The method of claim 11, wherein the first graphical interface is configured such that the at least one worker is permitted to select the ongoing emergency event only when the at least one worker is logged into the application and only if the at least one worker logged into the application meets a predetermined access level.

19. The method of claim 11, wherein the first graphical interface is further configured to permit the at least one worker to directly contact city emergency personnel associated with a geographic area where the retail facility is located.

20. The method of claim 11, wherein the first graphical interface is further configured to permit the at least one worker to type in additional details regarding the ongoing emergency event at the retail facility.

* * * * *